United States Patent
Hajati

(10) Patent No.: US 10,268,274 B2
(45) Date of Patent: *Apr. 23, 2019

(54) HAPTIC ACTUATOR INCLUDING COIL CARRIED IN INTERNAL RECESS AND RELATED METHODS

(71) Applicant: Apple Inc., Cupertino, CA (US)

(72) Inventor: Arman Hajati, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,374

(22) Filed: Jul. 25, 2017

(65) Prior Publication Data

US 2018/0239431 A1    Aug. 23, 2018

Related U.S. Application Data

(60) Provisional application No. 62/461,425, filed on Feb. 21, 2017.

(51) Int. Cl.
```
G09G 5/00     (2006.01)
G06F 3/01     (2006.01)
G06F 1/16     (2006.01)
```
(52) U.S. Cl.
CPC .......... *G06F 3/016* (2013.01); *G06F 1/1626* (2013.01); *G06F 3/011* (2013.01); *G06F 2203/04105* (2013.01)

(58) Field of Classification Search
CPC ........ G06F 1/1626; G06F 1/163; G06F 3/011; G06F 3/016; G06F 3/041; G08B 6/00; B06B 1/04; B06B 1/045; H01F 7/00; H01F 7/0205; H02K 33/00; H02K 33/02; H05K 5/00
See application file for complete search history.

(56) References Cited

U.S. PATENT DOCUMENTS

| | | | |
|---|---|---|---|
| 8,169,402 B2 | 5/2012 | Shahoian et al. | |
| 9,966,825 B2* | 5/2018 | Hajati | H02K 33/02 |
| 2012/0025742 A1* | 2/2012 | Masahiko | B06B 1/0207 |
| | | | 318/114 |
| 2014/0197936 A1 | 7/2014 | Biggs et al. | |

(Continued)

FOREIGN PATENT DOCUMENTS

| | | |
|---|---|---|
| WO | 2013169299 A1 | 11/2013 |
| WO | 2013169303 A1 | 11/2013 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Joe H Cheng

(74) *Attorney, Agent, or Firm* — Allen, Dyer, Doppelt + Gilchrist, P.A.

(57) ABSTRACT

A haptic actuator may include a housing having a top and a bottom. At least one of the top and the bottom may have a shape defining an internal recess therein. The haptic actuator may include a coil carried within the internal recess, and a field member having opposing first and second sides and that includes at least one permanent magnet adjacent the coil. The haptic actuator may also include a respective flexure bearing mounting each of the first and second sides of the field member to be reciprocally movable within the housing responsive to the coil.

30 Claims, 23 Drawing Sheets

(56) References Cited

U.S. PATENT DOCUMENTS

| | | |
|---|---|---|
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2017/0070131 A1* | 3/2017 | Degner .................. H02K 33/16 |
| 2018/0021812 A1* | 1/2018 | Akanuma ............... B06B 1/045 |
| | | 310/25 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

\* cited by examiner

HAPTIC ACTUATOR INCLUDING COIL CARRIED IN INTERNAL RECESS AND RELATED METHODS

RELATED APPLICATIONS

The present application claims the priority benefit of provisional application Ser. No. 62/461,425 filed on Feb. 21, 2017, the entire contents of which are herein incorporated in its entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing having a top and a bottom. At least one of the top and the bottom may have a shape defining an internal recess therein. The haptic actuator may include a coil carried within the internal recess, and a field member having opposing first and second sides and that includes at least one permanent magnet adjacent the coil. The haptic actuator may also include a respective flexure bearing mounting each of the first and second sides of the field member to be reciprocally movable within the housing responsive to the coil.

The shape may be a planar shape with a protrusion at a medial portion thereof defining the recess, for example. The top and the bottom may each have a shape defining top and bottom internal recesses. The coil may be carried within the top internal recess. The haptic actuator may also include a further coil carried within the bottom internal recess, for example.

The at least one permanent magnet may include a plurality of permanent magnets. The at least one permanent magnet may include a Halbach array of permanent magnets, for example.

The housing may include ferritic material. Each respective flexure bearing may have a V-shape. Each respective flexure bearing may have a wishbone shape, for example. The coil may include a loop-shaped coil.

A method aspect is directed to a method of making a haptic actuator. The method may include forming a housing having a top and a bottom, the housing being formed to have at least one of the top and the bottom have a shape defining an internal recess therein. The method may also include positioning a coil carried within the internal recess and positioning a field member having opposing first and second sides and that includes at least one permanent magnet adjacent the coil. The method may also include positioning a respective flexure bearing to mount each of the first and second sides of the field member to be reciprocally movable within the housing responsive to the coil.

Another aspect is directed to a haptic actuator that may include a housing having a top and a bottom and a coil around the top and bottom along an exterior of the housing. The haptic actuator may include a field member carried within the housing and having opposing first and second sides and including at least one permanent magnet moveable through the coil. The haptic actuator may also include a respective flexure bearing mounting each of the first and second sides of the field member to be reciprocally movable within the housing responsive to the coil.

The coil may be around a medial portion of the housing, for example. The top and the bottom of the exterior may have a recess therein, and the coil may be carried within the recess.

The at least one permanent magnet may include a plurality of permanent magnets. The plurality of permanent magnets may be arranged in opposing polarity, for example.

Each respective flexure bearing may have a V-shape. The coil may include a loop-shaped coil, for example.

A method aspect is directed to a method of making a haptic actuator. The method may include forming a housing having a top and a bottom and positioning a coil around the top and bottom along an exterior of the housing. The method may also include positioning a field member carried within the housing and having opposing first and second sides and that includes at least one permanent magnet moveable through the coil. The method may also include positioning a respective flexure bearing mounting each of the first and second sides of the field member to be reciprocally movable within the housing responsive to the coil.

Another aspect is directed to a haptic actuator that may include a housing having a top and a bottom, at least one of the top and the bottom having a shape defining an internal recess therein. The haptic actuator may include at least one permanent magnet carried within the internal recess and a field member having opposing first and second sides and that includes a coil adjacent the at least one permanent magnet. A respective flexure bearing may mount each of the first and second sides of the field member to be reciprocally movable within the housing responsive to the coil.

A method aspect is directed to a method of making a haptic actuator. The method may include forming a housing having a top and a bottom, the housing being formed to have at least one of the top and the bottom have a shape defining an internal recess therein. The method may also include positioning at least one permanent magnet carried within the internal recess and positioning a field member having opposing first and second sides and that includes a coil adjacent the at least one permanent magnet. The method may also include positioning a respective flexure bearing to mount each of the first and second sides of the field member to be reciprocally movable within the housing responsive to the coil.

A further aspect is directed to a haptic actuator that may include a housing having a top and a bottom, at least one coil around the top and bottom along an exterior of the housing, and a field member carried within the housing and having opposing first and second sides. The field member may include at least one permanent magnet moveable through the at least one coil. The field member may be reciprocally movable within the housing responsive to the at least one coil. The haptic actuator may also include a first shaft slidably coupling the first end of the field member to the housing, and a second shaft slidably coupling the second end of the field member to the housing. A first biasing member may be between the first end of the field member and the housing, and a second biasing member may be between the second end of the field member and the housing.

The at least one coil may be around a medial portion of the housing. The at least one coil may include a plurality of coils, for example.

The at least one permanent magnet include a plurality of permanent magnets, for example. The plurality of permanent magnets may be arranged in opposing polarity. The at least one coil may include a loop-shaped coil, for example.

The haptic actuator may further include first and second mechanical bearings carried by the field member and slidably receiving the first and second shafts. The first and second biasing members may include first and second springs, for example.

A method aspect is directed to a method of making a haptic actuator. The method may include forming a housing having a top and a bottom and positioning at least one coil around the top and bottom along an exterior of the housing. The method may also include positioning a field member within the housing and having opposing first and second sides and comprising at least one permanent magnet moveable through the at least one coil, the field member being reciprocally movable within the housing responsive to the at least one coil. The method may also include positioning a first shaft to slidably couple the first end of the field member to the housing and positioning a second shaft to slidably couple the second end of the field member to the housing. The method may also include positioning a first biasing member between the first end of the field member and the housing and positioning a second biasing member between the second end of the field member and the housing.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation, and numbers in increments of 100 are used to refer to like elements in different embodiments.

Figure 1:
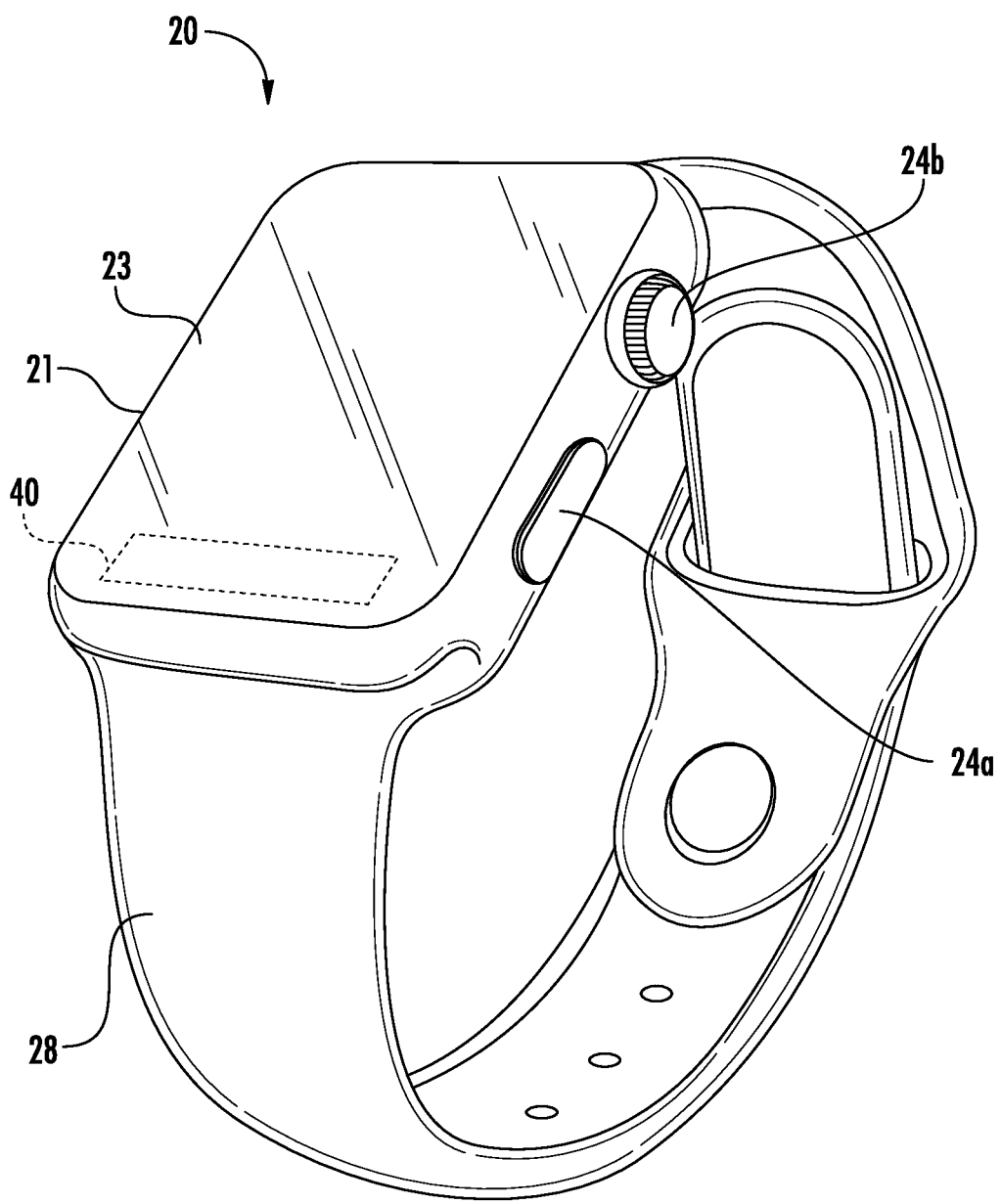
FIG. 1 is a perspective view of an electronic device including a haptic actuator according to an embodiment of the present invention.
Figure 2:
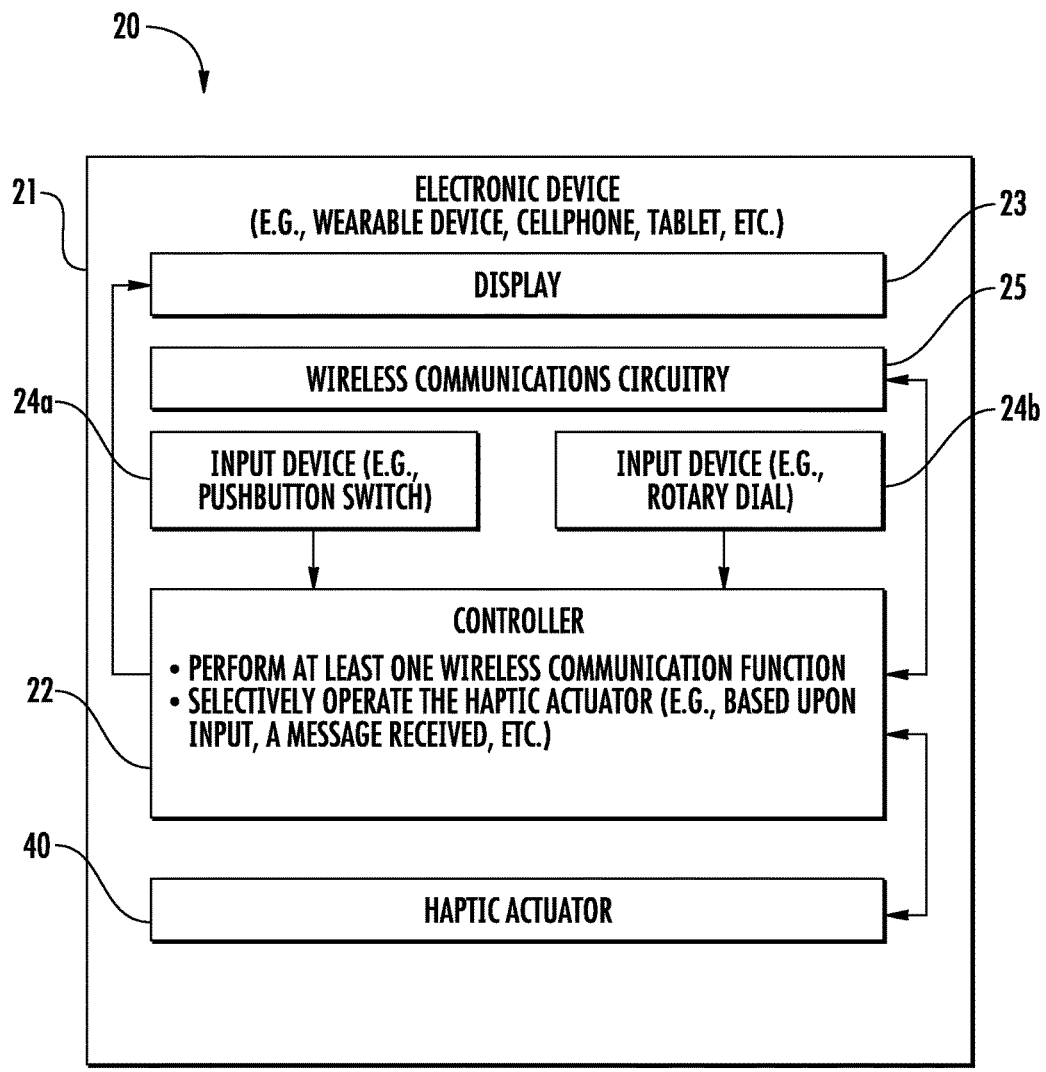
FIG. 2 is a schematic block diagram of the electronic device of FIG. 1.
Figure 3:
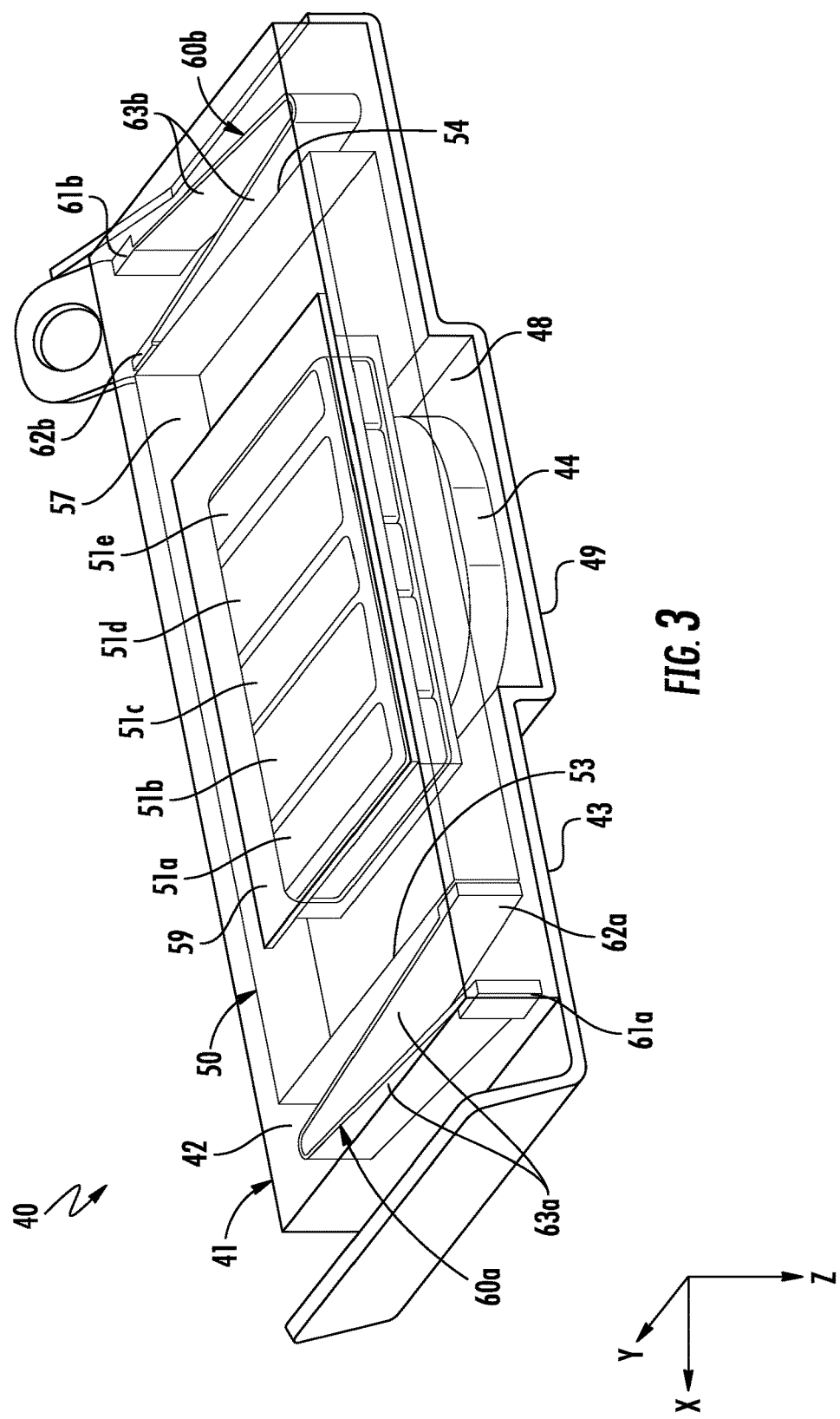
FIG. 3 is a perspective view of a haptic actuator in accordance with an embodiment.
Figure 4:
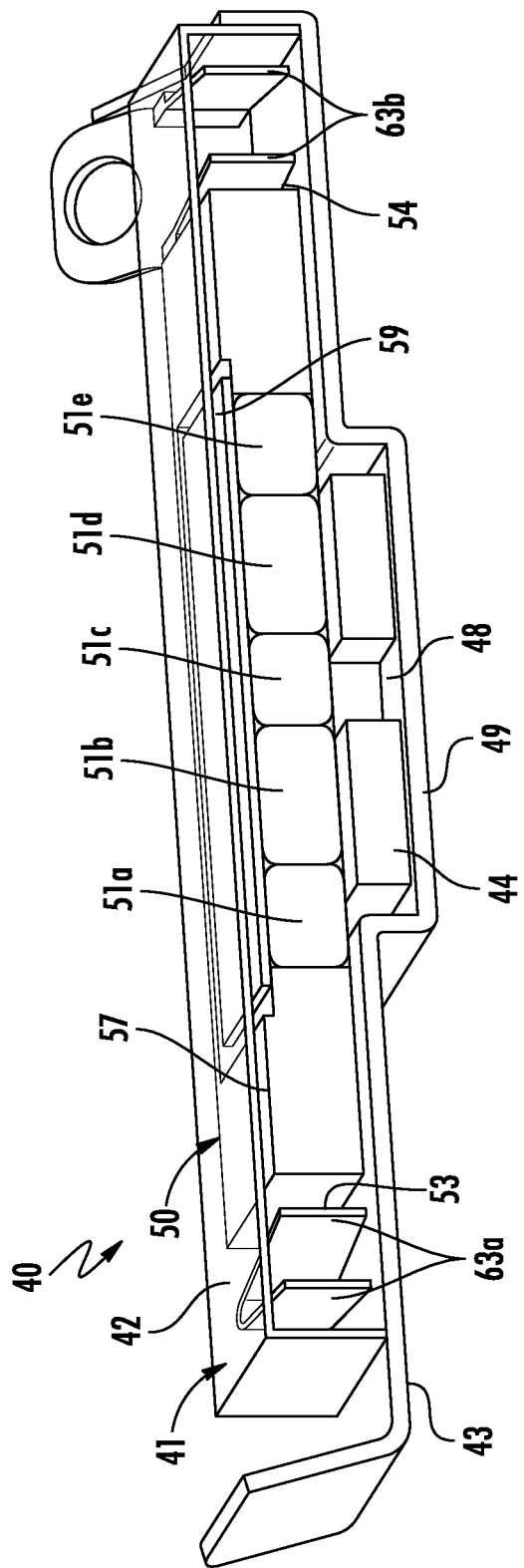
FIG. 4 is a cross-sectional view along the y-axis of the haptic actuator of FIG. 3.
Figure 5:
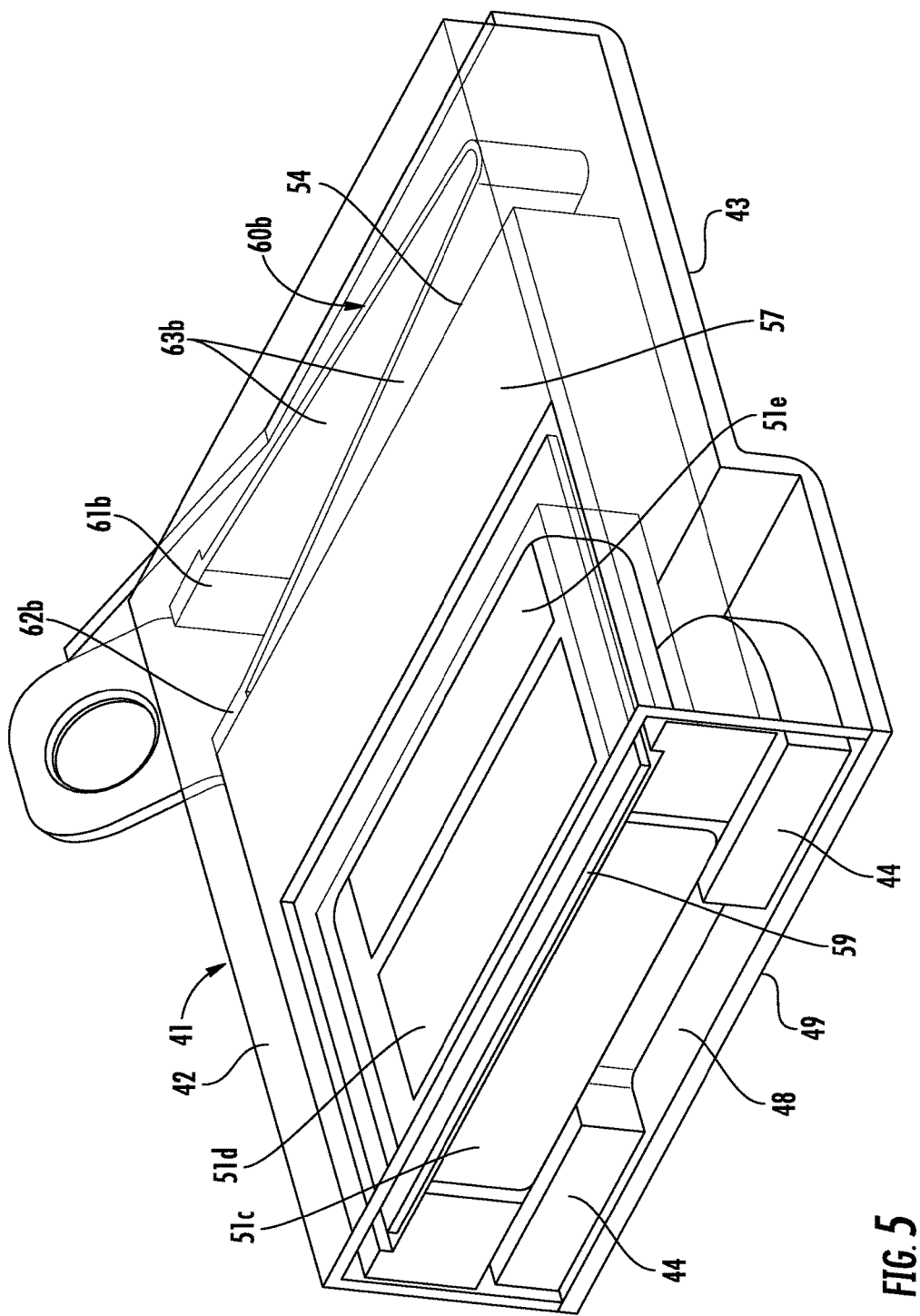
FIG. 5 is a cross-sectional view along the x-axis of the haptic actuator of FIG. 3.
Figure 6:
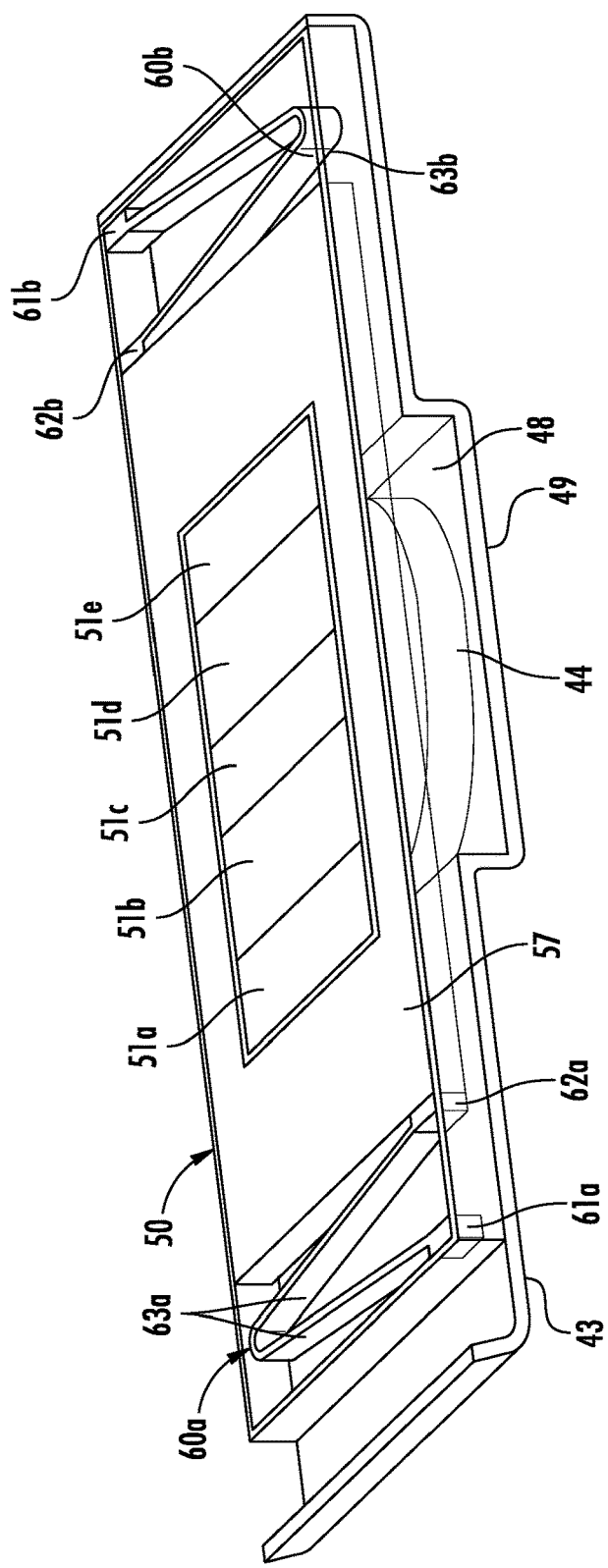
FIG. 6 is a cross-sectional view along the z-axis of the haptic actuator of FIG. 3.
Figure 7:
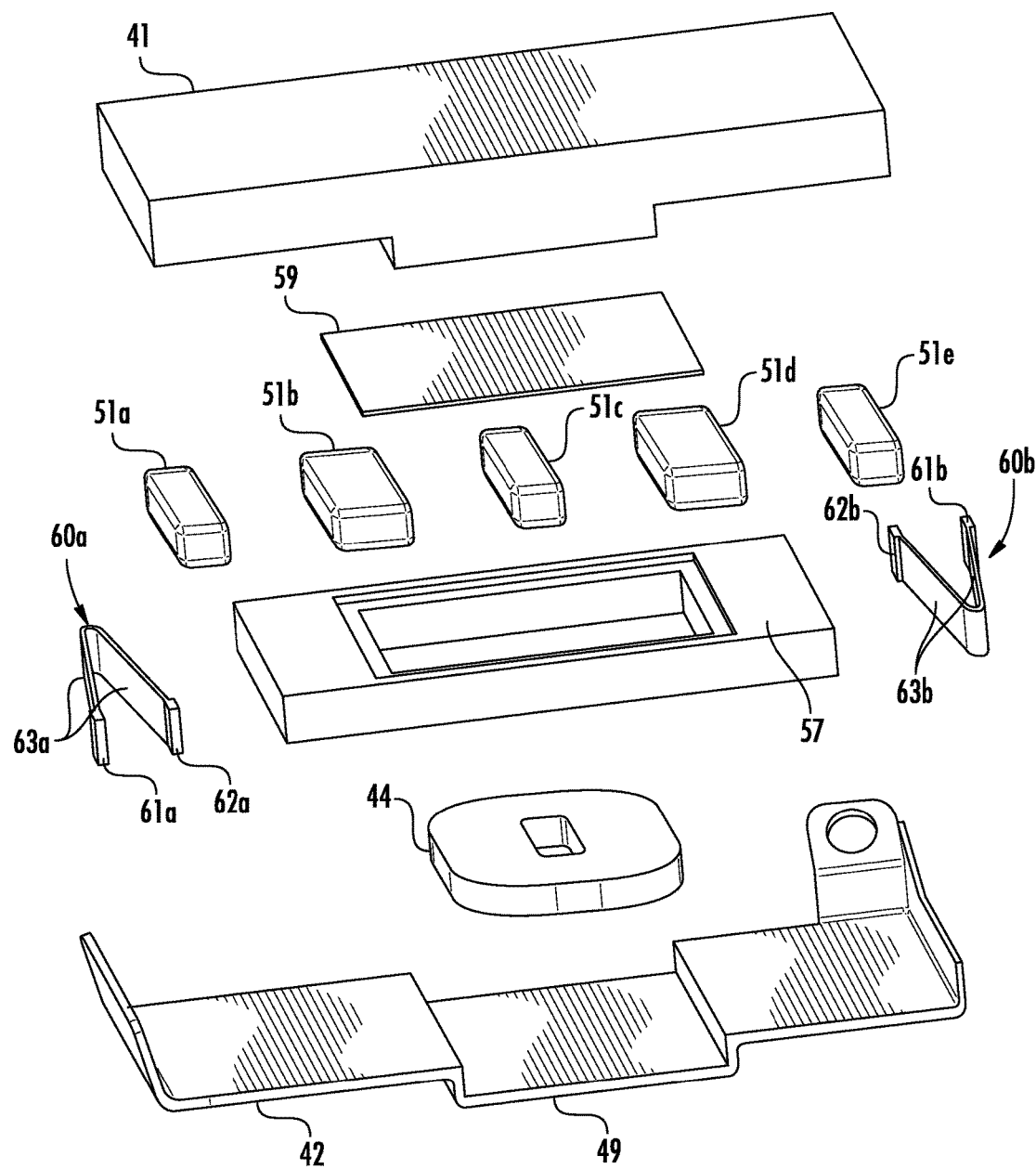
FIG. 7 is an exploded view of the haptic actuator of FIG. 3.
Figure 8:
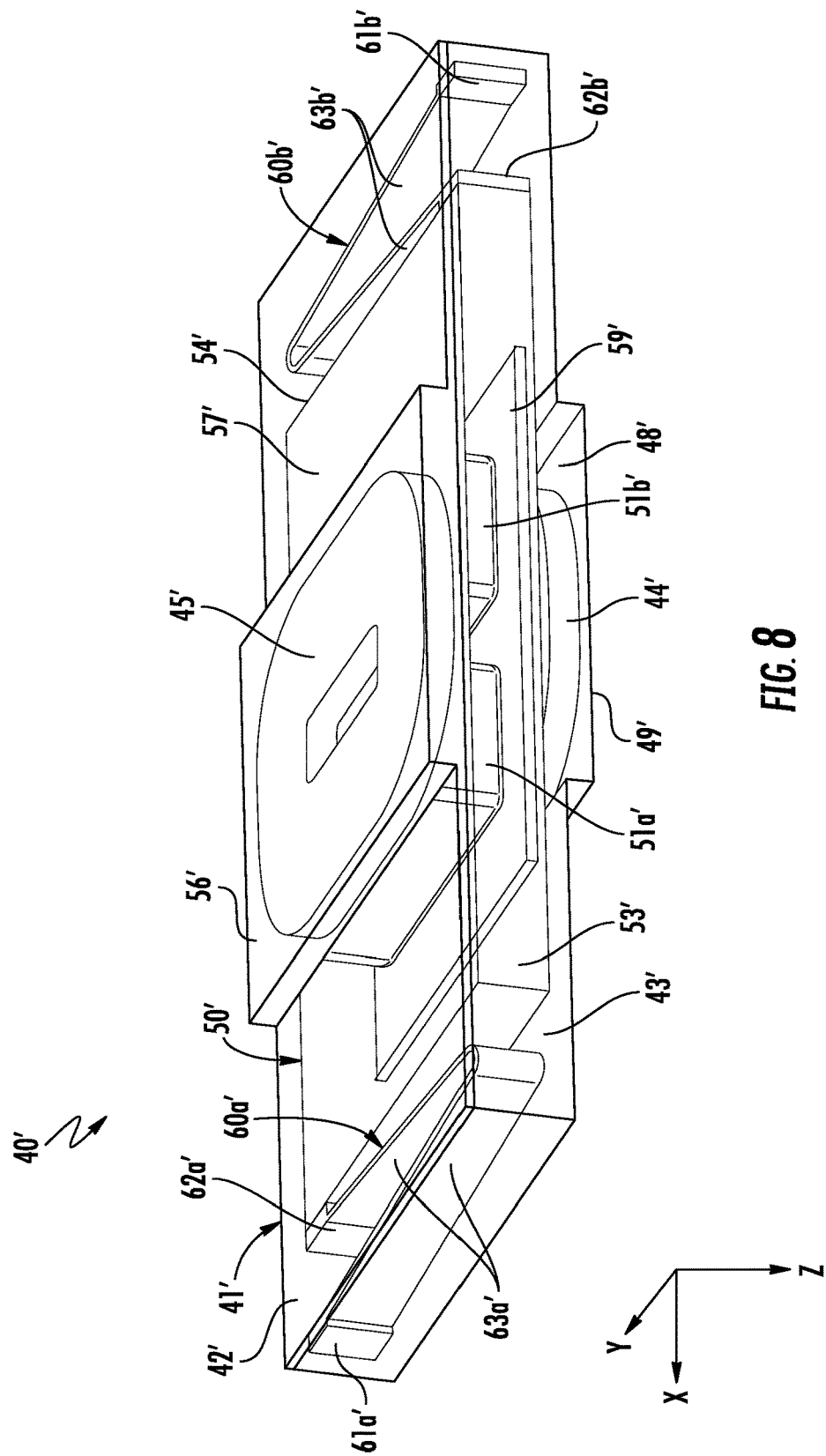
FIG. 8 is a perspective view of a haptic actuator in accordance with an embodiment.
Figure 9:
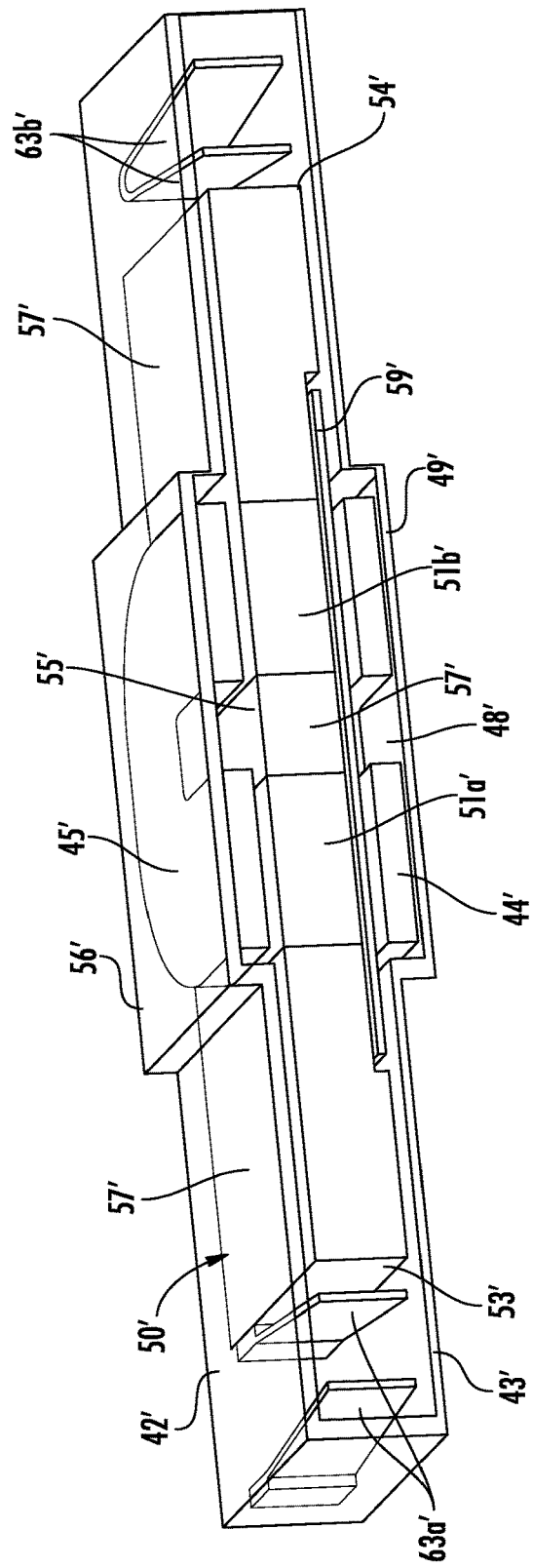
FIG. 9 is a cross-sectional view along the y-axis of the haptic actuator of FIG. 8.
Figure 10:
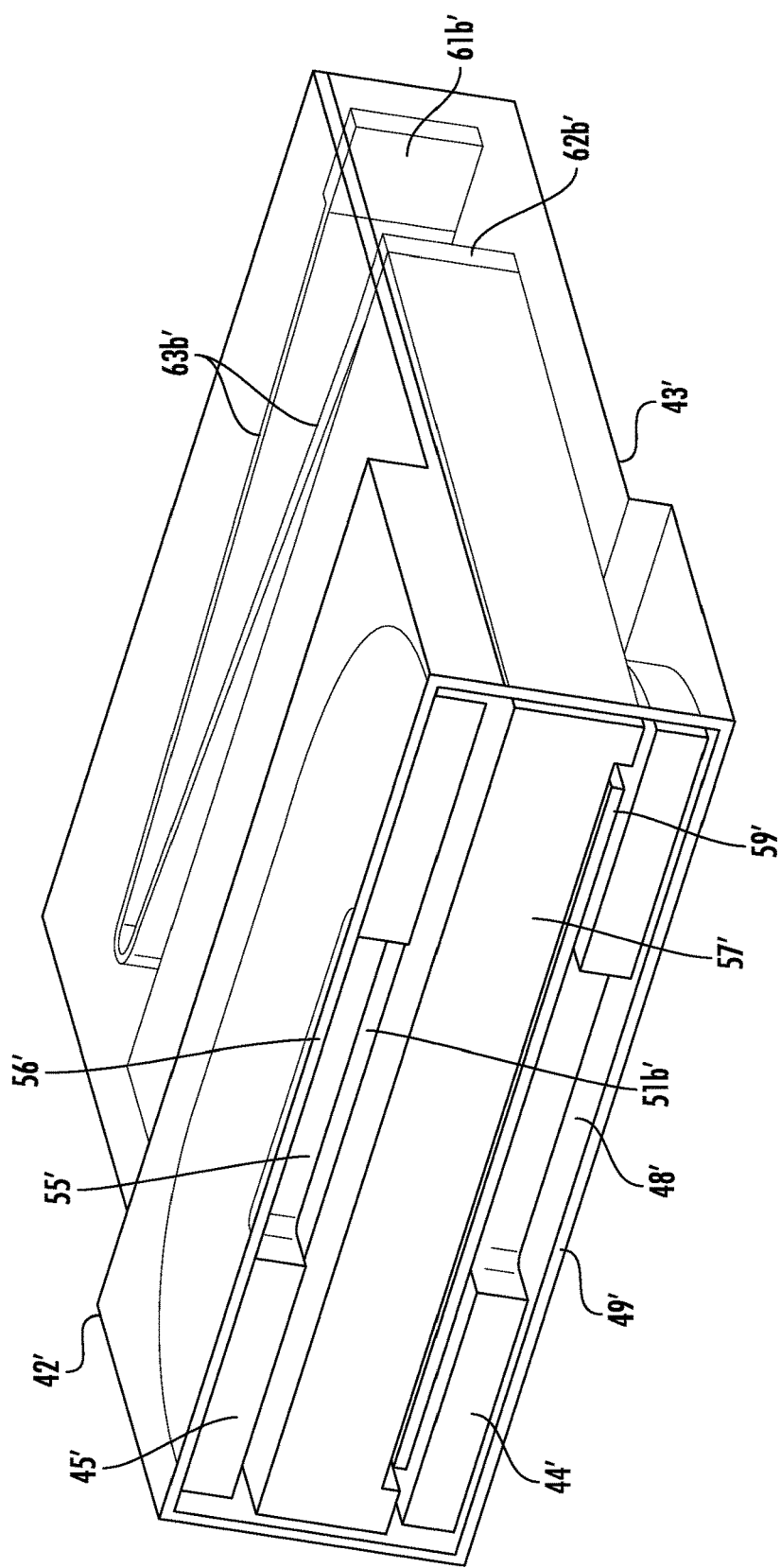
FIG. 10 is a cross-sectional view along the x-axis of the haptic actuator of FIG. 8.
Figure 11:
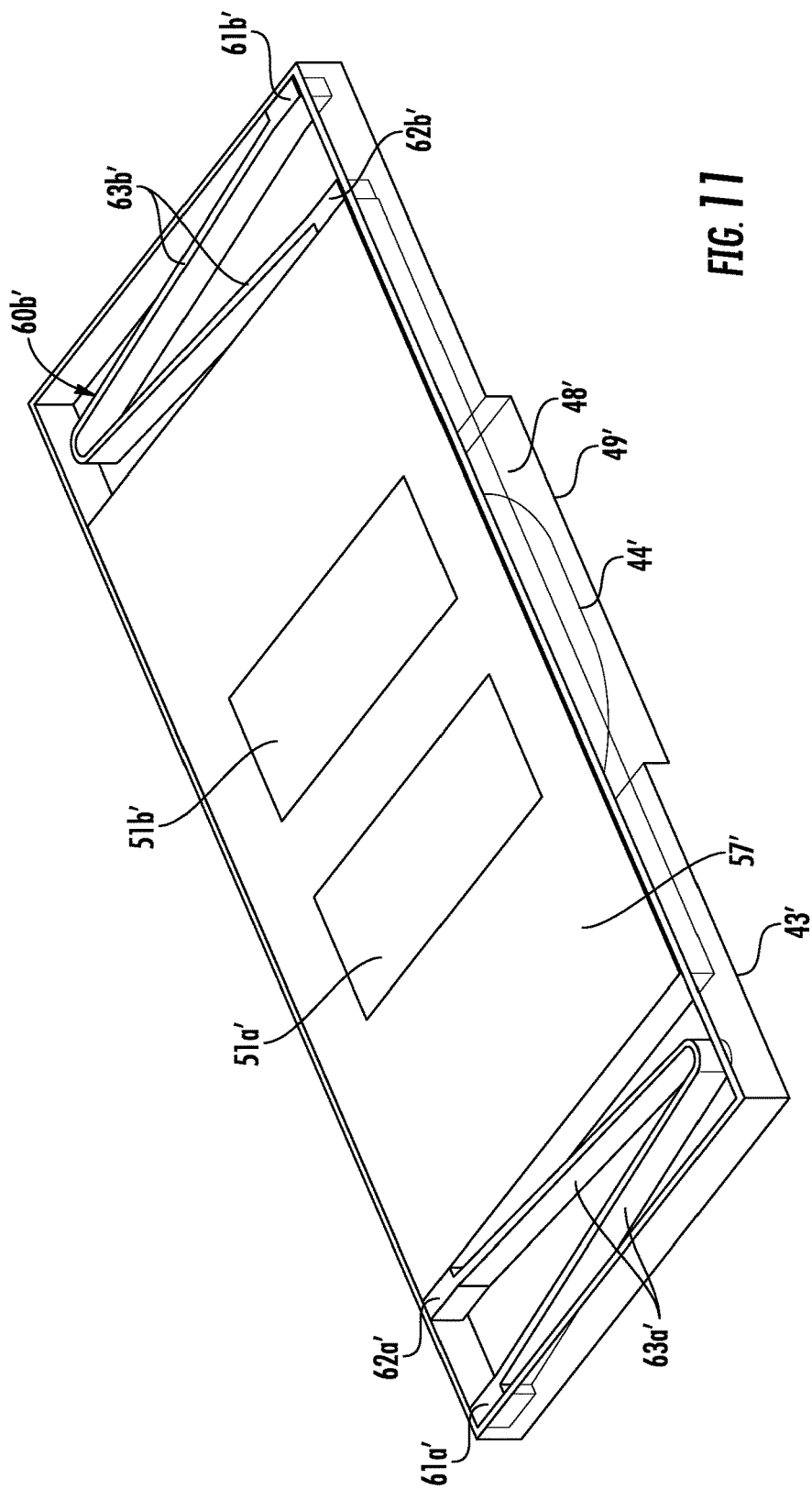
FIG. 11 is a cross-sectional view along the z-axis of the haptic actuator of FIG. 8.
Figure 12:
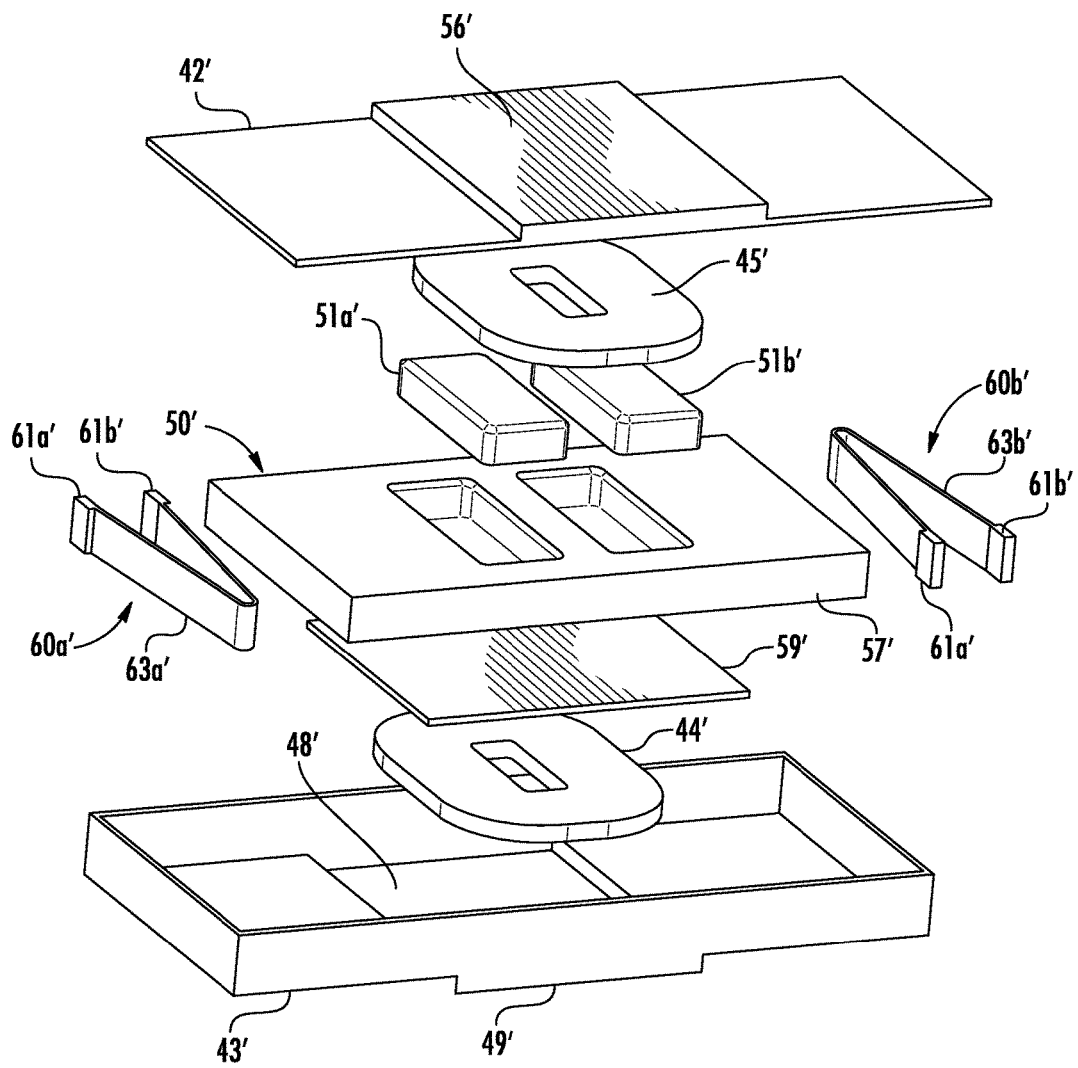
FIG. 12 is an exploded view of the haptic actuator of FIG. 8.
Figure 13:
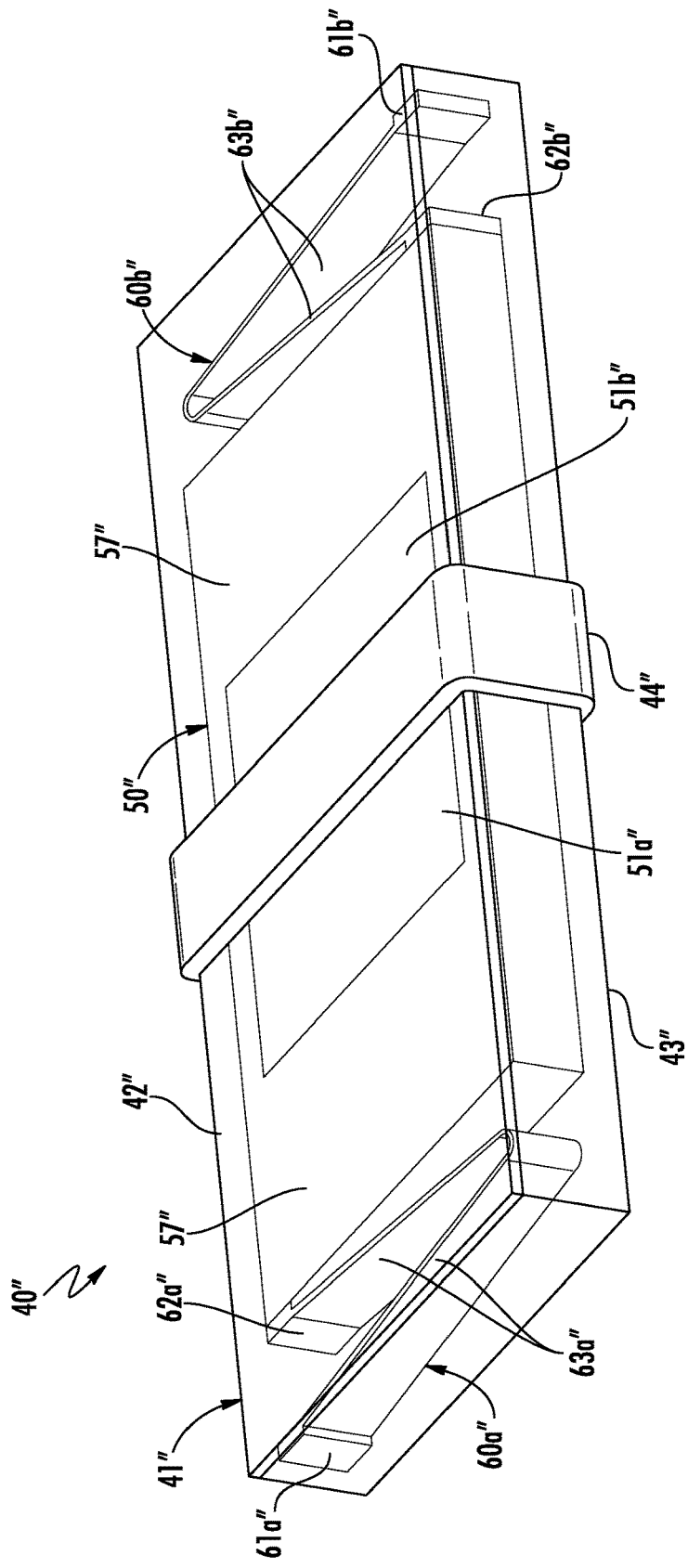
FIG. 13 is a perspective view of a haptic actuator in accordance with an embodiment.
Figure 14:
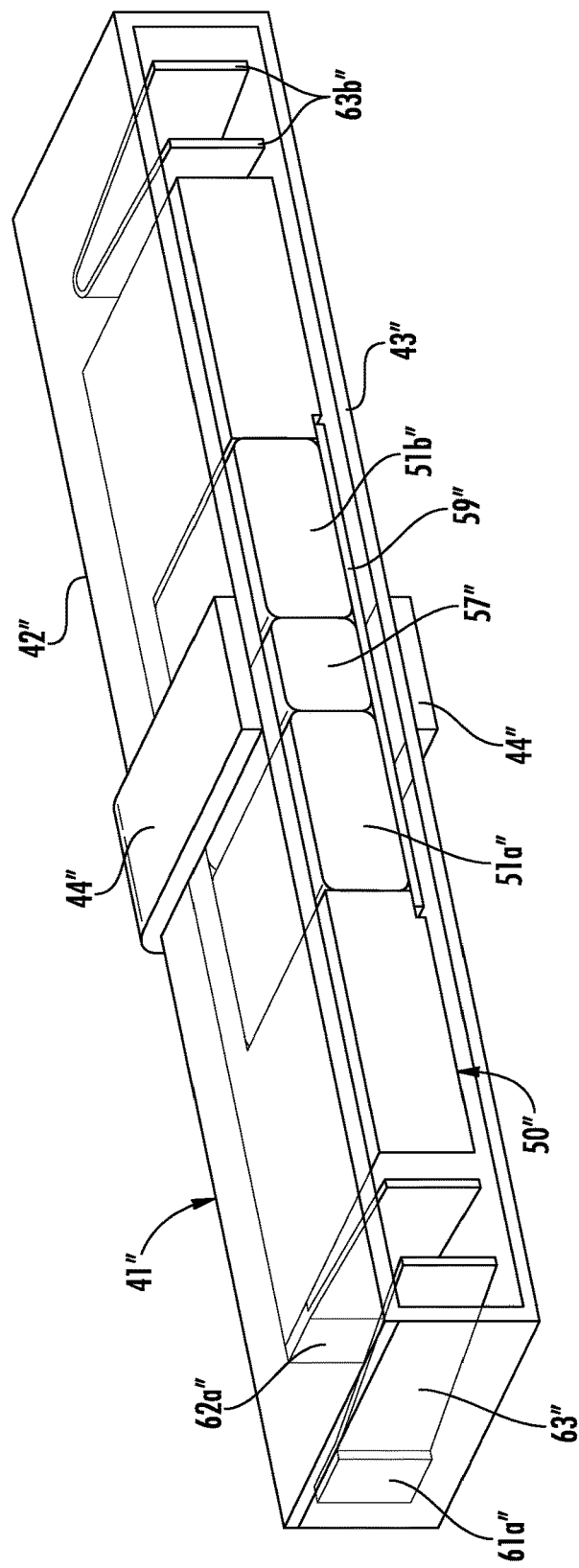
FIG. 14 is a cross-sectional view along the y-axis of the haptic actuator of FIG. 13.
Figure 15:
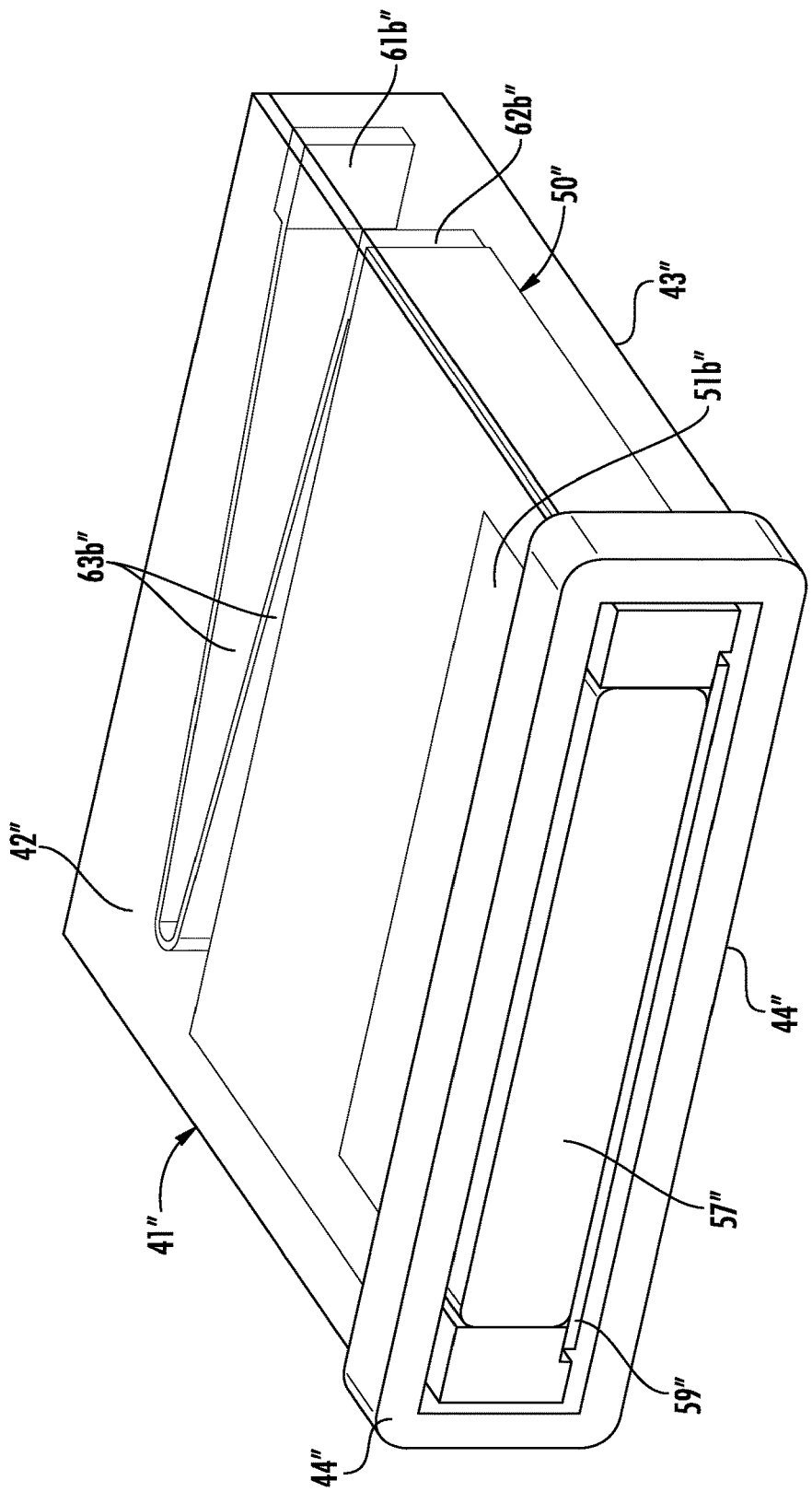
FIG. 15 is a cross-sectional view along the x-axis of the haptic actuator of FIG. 13.
Figure 16:
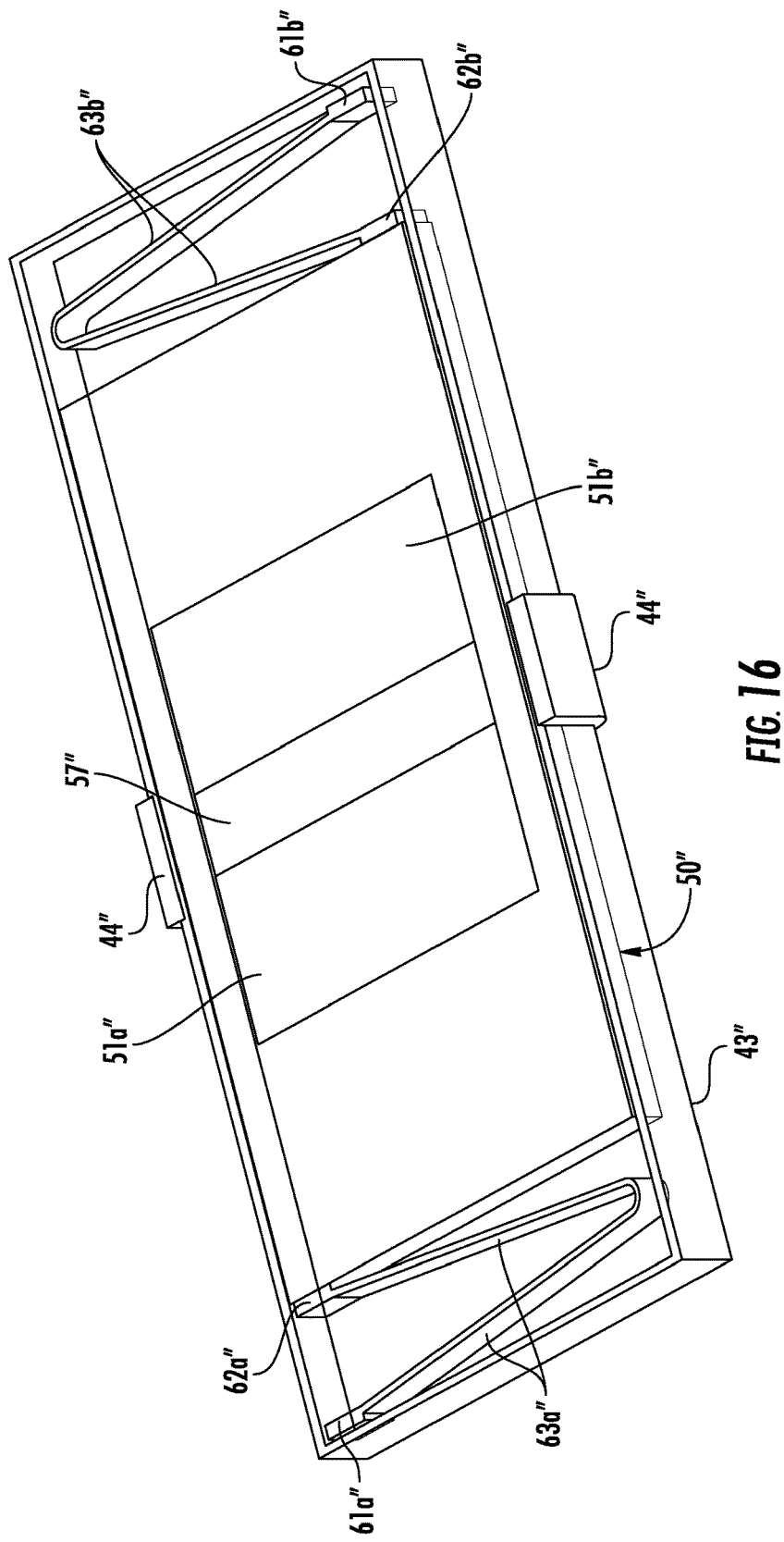
FIG. 16 is a cross-sectional view along the z-axis of the haptic actuator of FIG. 13.
Figure 17:
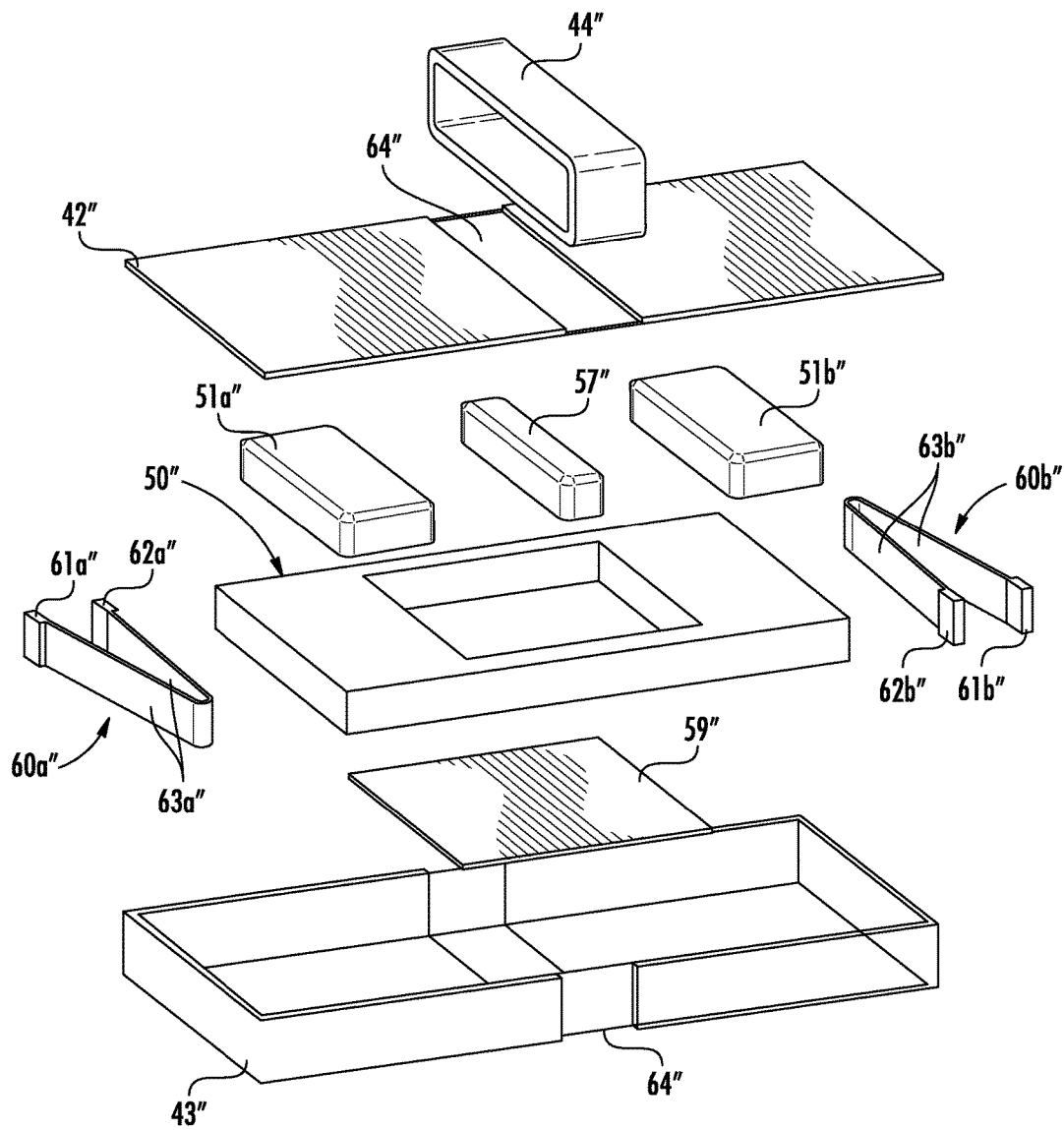
FIG. 17 is an exploded view of the haptic actuator of FIG. 13.

Referring initially to FIGS. 1 and 2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a liquid crystal display (LCD), light emitting diode (LED) display, or may be another type of display, as will be appreciated by those skilled in the art. The display 23 may be a touch display.

Finger-operated user input devices 24a, 24b, illustratively in the form of a pushbutton switch and a rotary dial are also carried by the device housing 21 and are coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the controller 22 applies a voltage to move a moveable body or masses between first and second positions in a y-axis.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Referring now additionally to FIGS. 3-7, the haptic actuator 40 includes an actuator housing 41. The actuator housing 41 illustratively has a dimension in a length direction greater than a width direction. More particularly, the actuator housing 41 has a top 42 and a bottom 43. The bottom 43, which includes a ferritic material, has a shape that defines an internal recess 48 therein. More particularly, the shape of the bottom 43 includes a planar shape with a protrusion 49 (i.e., hump) at a medial portion thereof defining the internal recess 48. In some embodiments, the medial portion or the protrusion 49 may include ferritic material, while the rest of the bottom 43 may not include ferritic material. Of course, other and/or additional portions of the actuator housing 41 may be ferritic. For example, the actuator housing 41 may be a hybrid of ferritic and non-ferritic sections whereby the protrusion 49 may be ferritic and the rest of the actuator housing is non-ferritic. This may improve performance while reducing manufacturing complexity.

The haptic actuator 40 also includes a coil 44 carried by the actuator housing 41, and more particularly, within the internal recess 48 of the bottom 43 of the actuator housing. The coil 44 illustratively is a planar coil and has a loop shape or a "racetrack" shape. Circuitry, for example, flexible circuitry may be coupled to the coil 44 and to upstream circuitry, for example, the controller 22 and/or other circuitry.

The haptic actuator 40 also includes a field member 50 carried by the actuator housing 41 that has opposing first and second sides 53, 54. The field member 50, similarly to the actuator housing 41, has a dimension in a length direction greater than a width direction. Thus, the field member 50 is reciprocally movable in the width direction (i.e., the y-direction). While the movement of the field member 50 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 also includes a mass 57 between the permanent magnets 51a-51e. The mass 57 may be tungsten, for example. The mass 57 may be a different material.

The field member 50 illustratively includes permanent magnets 51a-51e arranged in a Halbach array. The permanent magnets 51a-51e may be neodymium, for example. In some embodiments, the permanent magnets 51a-51e may be positioned in other directions with respect to their poles. Moreover, while five permanent magnets are illustrated, it will be appreciated that any number of permanent magnets may be used. The field member 50 may include a cover 59 over the permanent magnets 51a-51e.

The haptic actuator 40 also includes respective flexure bearings 60a, 60b mounting each of the first and second sides 53, 54 of the field member 50 to be reciprocally movable within the actuator housing 41 responsive to the coil 44. Each flexure bearing 60a, 60b illustratively has a V-shape.

More particularly, each flexure bearing 60a, 60b includes a first end member 61a, 61b, and a second end member 62a, 62b. The second end member 62a, 62b is coupled to an adjacent side 53, 54 of the field member 50. Each flexure bearing 60a, 60b also includes a pair of spaced apart flexible arms 63a, 63b coupled between the first and second end members 61a, 61b, 62a, 62b. Each flexure bearing 60a, 60b may have more than one pair of spaced apart flexible arms. Other types of flexure bearings may be used, for example, which may have a different shape, size, flexure members, and/or anchor members. Moreover, while flexure bearings are described, as will be explained in further detail below, in some embodiments, flexure bearings may be replaced with or used in conjunction with shafts, biasing members, and mechanical bearings.

Referring now to FIGS. 8-12, in another embodiment, the top 42' and the bottom 43' of the haptic actuator housing 41' each have a shape that defines top and bottom internal recesses 55', 48'. Each shape is illustratively a planar shape with protrusions 56', 49' at the respective medial portion thereof to define the respective recesses 55', 48'. While the top and bottom internal recesses 55', 48' and protrusions 56', 49' are illustratively aligned to define a symmetrical actuator, in some embodiments, the top and bottom internal recesses 55', 48' and protrusions 56', 49' may not be aligned and may be offset, for example.

A further coil 45' is carried within the second internal recess 55'. Similarly to the first coil 44', the second coil 45' is in the form of a planar coil and has a loop shape or a "racetrack" shape. Of course, the first and second coils 44', 45' may have a different shape, for example, a voice coil.

The field member 50' illustratively includes permanent magnets 51a', 51b' between the first and second coils 44', 45'. The permanent magnets 51a', 51b' may be neodymium, for example, and may be positioned in opposing directions with respect to their respective poles.

The permanent magnets 51a', 51b' also have a rectangular shape and are aligned along a length of the first and second coils 44', 45'. While a pair of rectangular shaped permanent magnets is illustrated, it will be appreciated that there may be any number of permanent magnets having any shape between the first and second coils 44', 45'. The mass 57' of the field member 50' also extends between the permanent magnets 51a', 51b'. The respective flexure bearings 60a', 60b' are similar to those describe above and need no further discussion herein. While the above-embodiments have been described herein wherein the coil is carried within the internal recess in the actuator housing, it will be appreciated that in some embodiments, the permanent magnets may be carried within the internal recess, as will be described in further detail below.

A method aspect is directed to a method of making a haptic actuator 40. The method includes forming an actuator housing 41 having a top 42 and a bottom 43. The housing is formed to have at least one of the top 42 and the bottom 43 to have a shape defining an internal recess 48 therein. The method also includes positioning a coil 44 carried within the internal recess 48, and positioning a field member 50 having opposing first and second sides 53, 54 and that includes at least one permanent magnet 51a-51e adjacent the coil. The method also includes positioning a respective flexure bearing 60a, 60b to mount each of the first and second sides 53, 54 of the field member 50 to be reciprocally movable within the housing responsive to the coil 44.

Referring now to FIGS. 13-17, in another embodiment, a coil 44" is around the top 42" and bottom 43" along an exterior of the actuator housing 41". The coil 44" is illustratively has a loop shape and is around a medial portion of the actuator housing 41", however, in some embodiments, the coil 44" may be around other portions of the actuator housing.

The actuator housing 41" has a recess 64" therein. The coil 44" is carried within the recess 64". In some embodiments, there may not be a recess or the coil may be coupled to the actuator housing 41" using other techniques. Similar to the other embodiments described above, the haptic actuator 40" also includes a field member 50" carried within the actuator housing 41" and has opposing first and second sides. The field member 50" also includes permanent magnets 51a", 51b", arranged in opposing polarity, and moveable through the coil 44".

The haptic actuator 40" also includes respective flexure bearings 60a", 60b" mounting each of the first and second sides of the field member 50" to be reciprocally movable within the actuator housing 41" responsive to the coil 44". Each flexure bearing 60a", 60b" is similar to those described above with respect to the other embodiments.

As will be appreciated by those skilled in the art, as electronic devices become smaller, it may be desirable to reduce the height of the haptic actuator or the available z-axis space. However, performance of the haptic actuator is based upon z-axis configurations, and thus it may be possible that performance is reduced as the z-axis size is also reduced. By exploiting localized extra z-axis space this may significantly improve the performance of the haptic actuator. Moreover, unused volume that is typically used for mechanical stops may be reduced. Moreover, such configurations as described in the above embodiments may simplify the shape of the mass, which may result in a simpler and cheaper haptic actuator relative to other actuator designs.

In particular, the mass and permanent magnets tend to be relatively thin in some prior art haptic actuators. This may significantly reduce the bending stiffness of the mass and also may drastically increase the risk of demagnetization at relatively low temperatures. Additionally, unlike prior art haptic actuator designs, coils, flexible circuits, and any sensors that may be carried in the recess may be more protected against shock, for example, as a result of a drop.

As will be appreciated by those skilled in the art, the embodiment described with respect to FIGS. 13-17 may offer increased efficient usage of z-axis space, as the field member 50" may be formed as a single or monolithic unit, which was generally not possible in prior art haptic actuator designs. Moreover, electrical connections can be routed from the coils to the system outside of the moving mass stroke region to save engine volume and improve reliability.

A method aspect is directed to a method of making a haptic actuator 40" which includes forming an actuator housing 41" having a top 42" and a bottom 43". The method includes positioning a coil 44" around the top 42" and bottom 43" along an exterior of the actuator housing 41" and positioning a field member 50" carried within the actuator housing and having opposing first and second sides 53", 54" and that includes at least one permanent magnet 51a", 51b" moveable through the coil 44". The method also includes positioning a respective flexure bearing 60a", 60b" mounting each of the first and second sides 53", 54" of the field member 50" to be reciprocally movable within the actuator housing 41" responsive to the coil 44".

Figure 18:
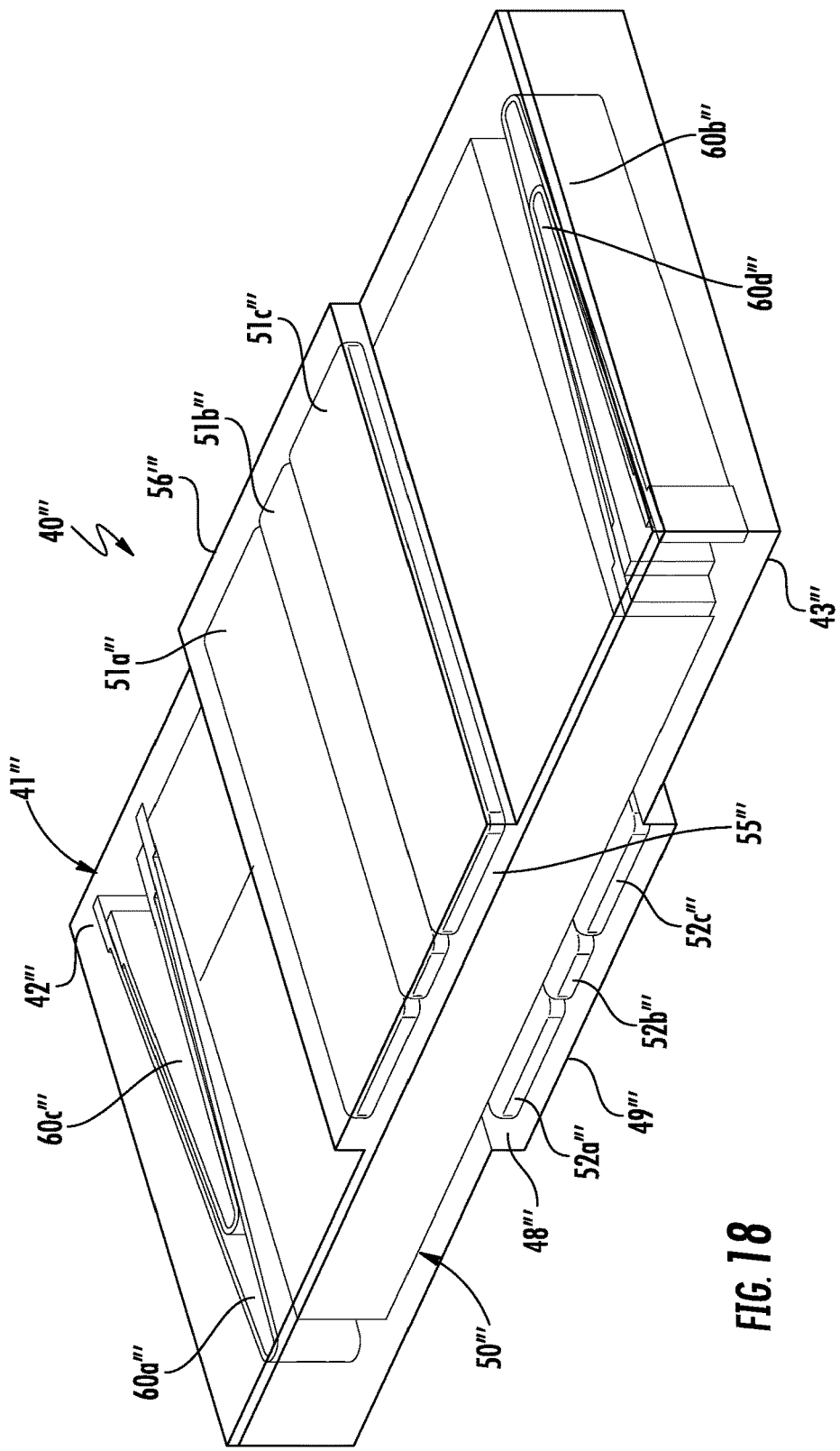
FIG. 18 is a perspective view of a haptic actuator in accordance with an embodiment.
Figure 19:
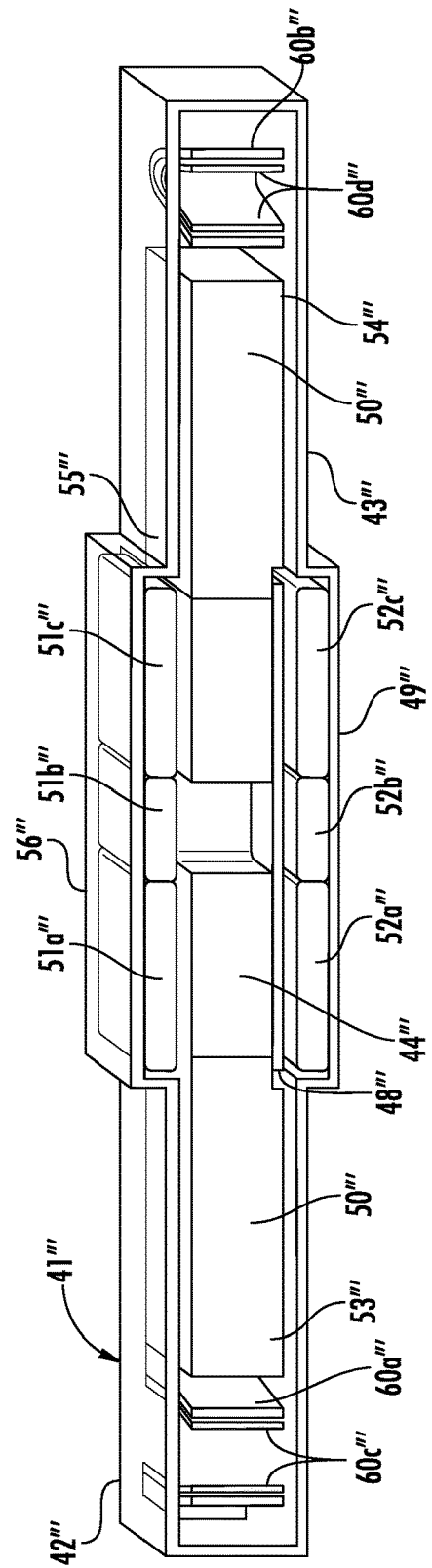
FIG. 19 is a cross-sectional view along the y-axis of the haptic actuator of FIG. 18.
Figure 20:
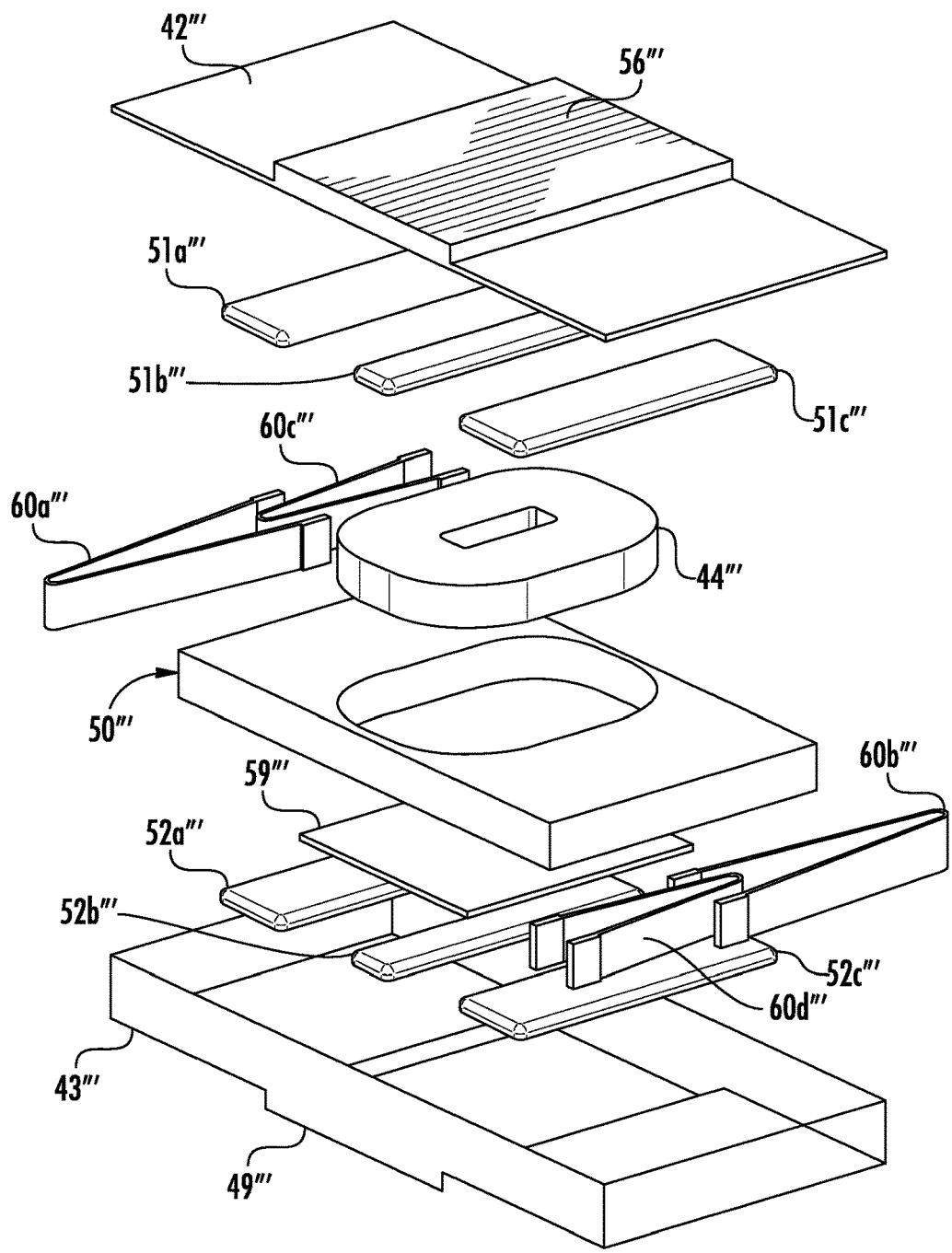
FIG. 20 is an exploded view of the haptic actuator of FIG. 18.

Referring now to FIGS. 18-20, in another embodiment of the haptic actuator 40''', instead of a respective coil 44''' being carried within the first and second, or top and bottom, internal recesses 55''', 48''', respective sets of permanent magnets 51a'''-51c''', 52a'''-52c''' each arranged in a Halbach array are carried within the top and bottom internal recesses. Protrusions 56''', 49''' are at the respective medial portion of the actuator housing 41''' to define the respective recesses 55''', 48'''. The field member 50''' includes the coil 44'''. The field member may include more than one coil 44'''. A cover 59''' is illustratively between the second or bottom set or permanent magnets 52a'''-52c''' and the coil 44'''.

The haptic actuator 40''' also includes four flexure bearings 60a'''-60d'''. A first pair of the flexure bearings 60a''', 60c''' mounts the first side 53''' of the field member 50''' within the actuator housing 41''', and a second pair of the flexure bearings 60b'''-60d''' mounts the second side 54''' of the field member within the actuator housing. The flexure bearings of each pair 60a'''-60d''' overlap or are in a nested configuration. In some embodiments, the flexure bearings 60a'''-60d''' may not overlap or be nested, and/or other or different types of flexure bearings may be used. In some embodiments, flexure bearings may not be used, and the haptic actuator 40''' may include a shaft and biasing members. Other elements illustrated but not described are similar to those described above in other embodiments and need no further discussion herein.

A method aspect is directed to a method of making the haptic actuator 40'''. The method includes positioning at least one permanent magnet within the internal recess, and the field member 50''' includes a coil adjacent the at least one permanent magnet.

Figure 21:
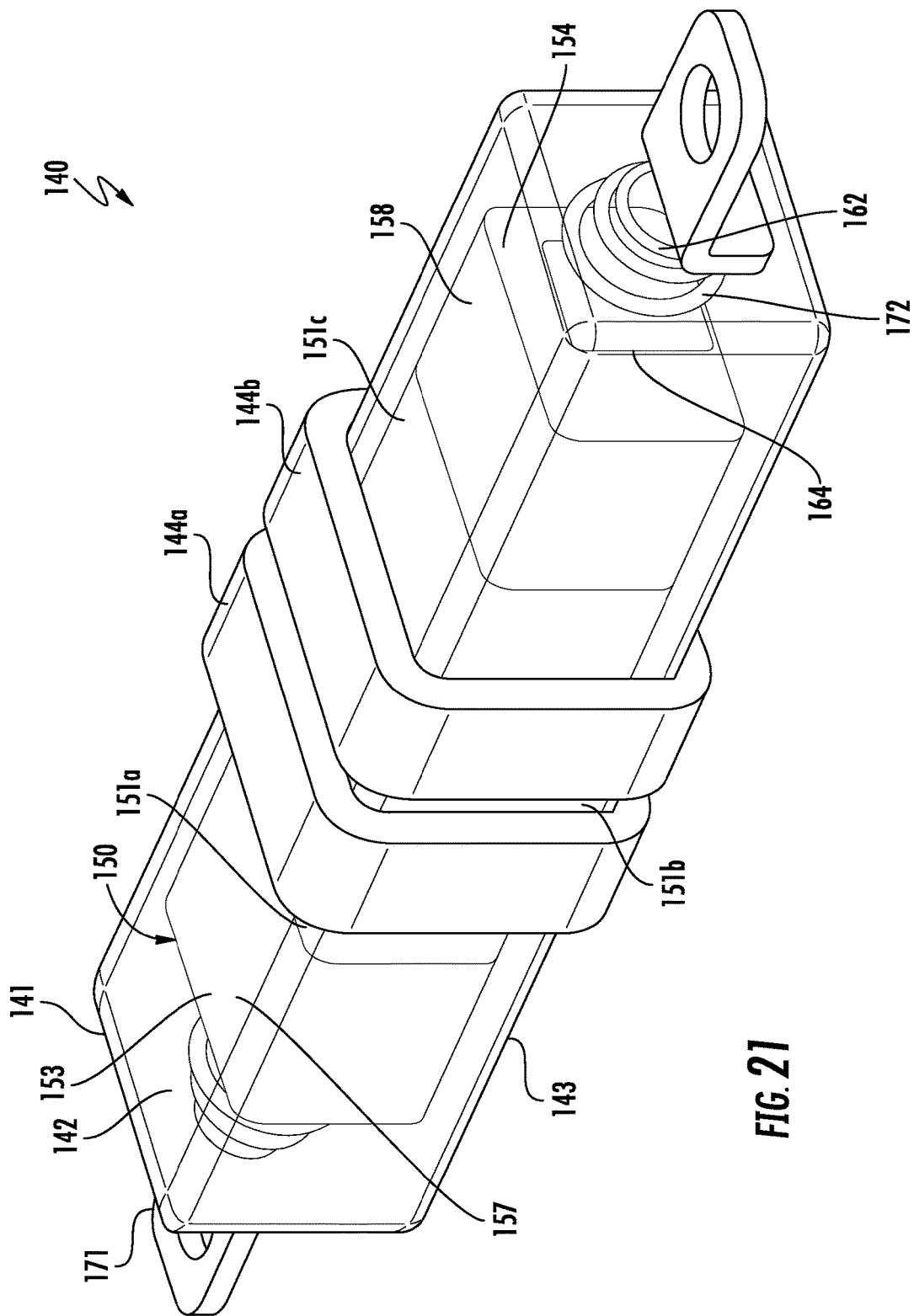
FIG. 21 is a perspective view of a haptic actuator in accordance with an embodiment.
Figure 22:
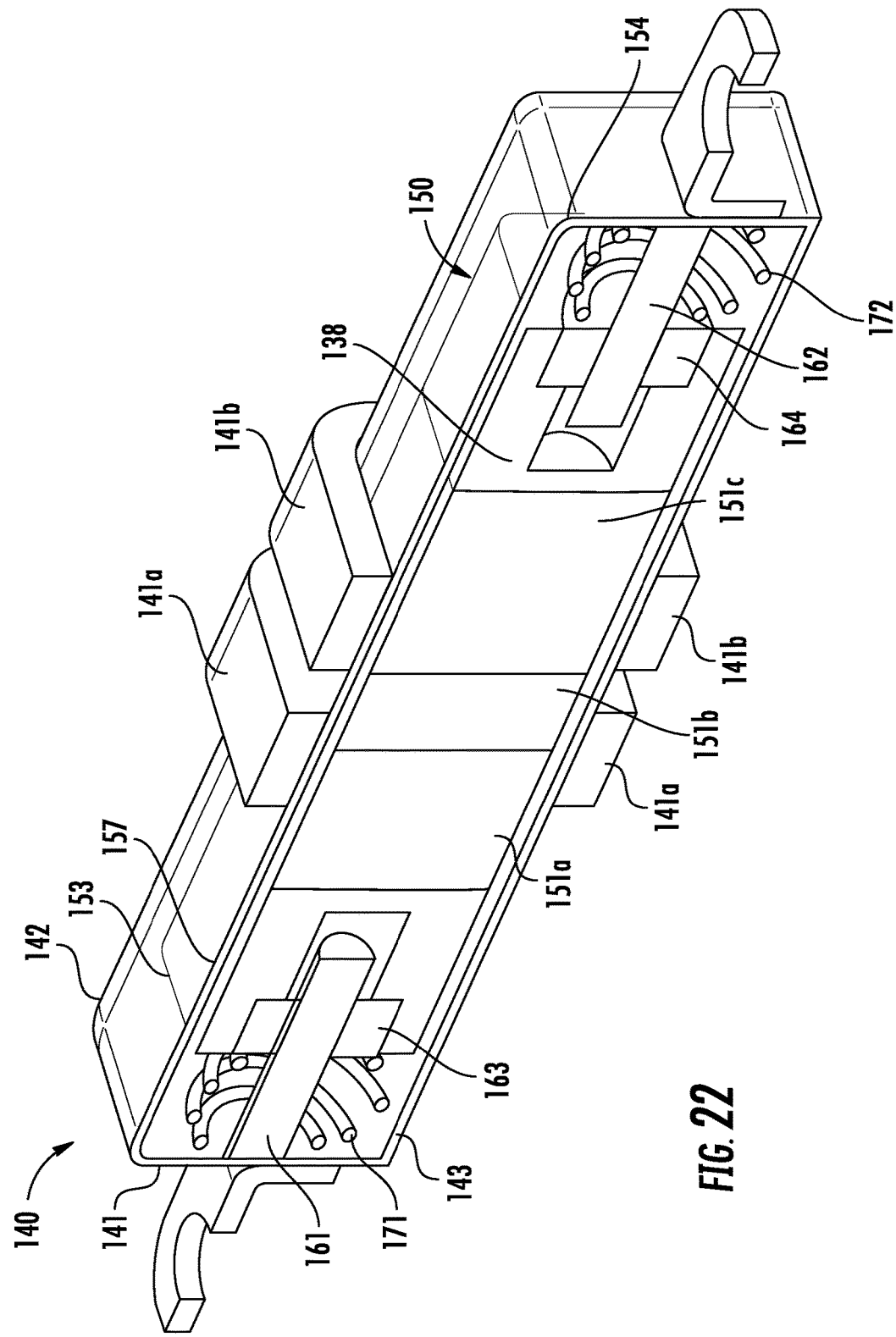
FIG. 22 is a y-axis cross-sectional view of the haptic actuator of FIG. 21.
Figure 23:
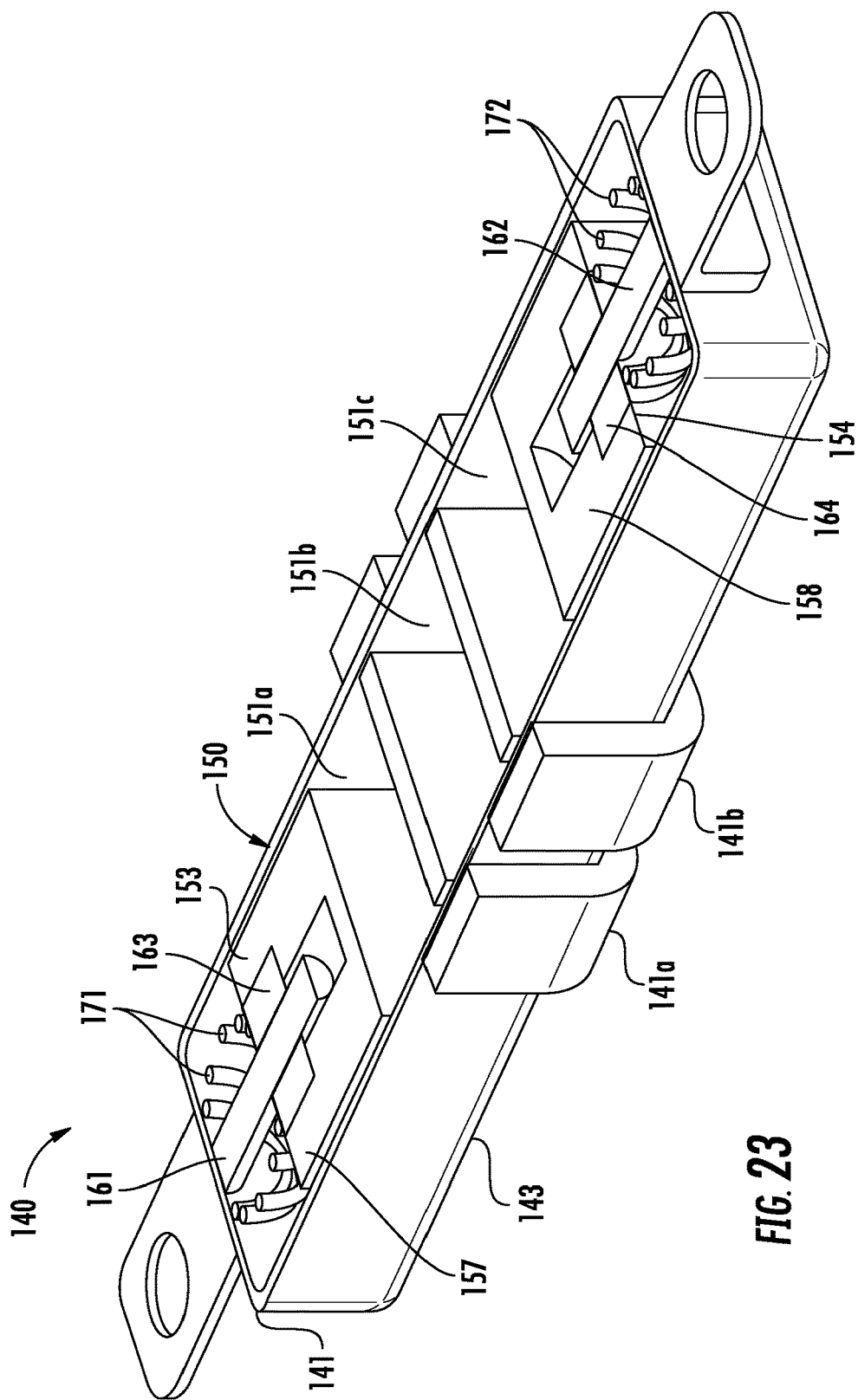
FIG. 23 is a z-axis cross-sectional view of the haptic actuator of FIG. 21.

Referring now to FIGS. 21-23, in another embodiment, similar to the embodiments described in FIGS. 13-18, a haptic actuator 140 includes coils 144a, 144b around the top 142 and the bottom 143 along an exterior of the actuator housing 141. The first and second coils 144a, 144b each illustratively has a loop shape and is around a medial portion of the actuator housing 141, however, in some embodiments, the first and second coils may be around other portions of the actuator housing.

The actuator housing 141 may, similar to the embodiments described above with respect to FIGS. 13-18, have one or more recesses therein to carry either or both of the first and second coils 144a, 144b. Of course, the first and second coils 144a, 144b may be coupled to the actuator housing 141 using other techniques.

Similar to the other embodiments described above, the haptic actuator 140 also includes a field member 150 carried within the actuator housing 141 and has opposing first and second sides. The field member 150 also includes permanent magnets 151a-151c arranged in opposing polarity (e.g., a Halbach array), and moveable through the first and second coils 144a, 144b.

The field member 150 includes a first mass 157 between a first end 153 and the permanent magnets 151a-151c. A second mass 158 is between a second end 154 and the permanent magnets 151a-151c.

Differently from the above-described embodiments that include flexure bearings, the haptic actuator 140 also includes a first shaft 161 slidably coupling the first mass 157 to the actuator housing 141. A second shaft 162 slidably couples the second mass 158 to the actuator housing 141. First and second mechanical bearings 163, 164 are carried by the first and second masses 157, 158 and slidably receive the first and second shafts 161, 162. The first and second mechanical bearings 163, 164 may be slot bearings, for example. The first and second mechanical bearings 163, 164 may be mounted such that they are mounted on the moving mass 157, 158 (and hence the shafts 161, 162 are fixed to the actuator housing 141) or mounted on the actuator housing (and hence the shafts are fixed to the moving mass).

The haptic actuator 140 also includes a first biasing member 171 between the first end 153 of the field member 150 and the actuator housing 141 and a second biasing member 172 between the second end 154 of the field member and the actuator housing. The first and second biasing members 171, 172 may be springs, for example, and more particularly, coil and/or leaf springs, and may be steel. The first and second biasing members 171, 172 may be other types of biasing members and may be another material. There may be more than one biasing member between the each end of the field member 150 and adjacent portions of the actuator housing 141.

A method aspect is directed to a method of making a haptic actuator 140. The method includes forming a housing 141 having a top 142 and a bottom 143 and positioning coils 144a, 144b around the top and bottom along an exterior of the housing. The method also includes positioning a field member 150 within the housing and having opposing first and second sides 153, 154 and includes permanent magnets 151a-151c moveable through the at least one coil 144a, 144b. The field member 150 is reciprocally movable within the actuator housing 141 responsive to the coils 144a, 144b. The method includes positioning a first shaft 161 to slidably couple the first end 153 of the field member 150 to the actuator housing 141 and positioning a second shaft 162 to slidably couple the second end 154 of the field member to the actuator housing. The method further includes positioning a first biasing member 171 between the first end 153 of the field member 150 and the actuator housing 141, and positioning a second biasing member 172 between the second end 154 of the field member and the actuator housing.

While embodiments have been described with respect to both flexure bearings and shafts, it will be appreciated that embodiments described herein as including flexure bearings may alternatively or additionally include shafts and/or biasing members. Embodiments described herein as including shafts and/or biasing members may alternatively or additionally include flexure bearings.

While several different embodiments have been described herein, it should be appreciated that elements from each or any of the embodiments described herein may be used with other elements from other or different embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

A haptic actuator comprises a housing having a top and a bottom and a coil around the top and bottom along an exterior of the housing. The haptic actuator comprises a field member carried within the housing and having opposing first and second sides and comprising at least one permanent magnet moveable through the coil. The haptic actuator comprises a respective flexure bearing mounting each of the first and second sides of the field member to be reciprocally movable within the housing responsive to the coil.

The coil is around a medial portion of the housing.

The top and the bottom of the exterior have a recess therein, and the coil is carried within the recess.

The at least one permanent magnet comprises a plurality of permanent magnets.

The plurality of permanent magnets are arranged in opposing polarity.

Each respective flexure bearing has a V-shape.

The coil comprises a loop-shaped coil.

An electronic device comprises a housing, wireless communications circuitry carried by the housing, and a haptic actuator carried by the housing. The haptic actuator comprises an actuator housing having a top and a bottom and a coil around the top and bottom along an exterior of the housing. The haptic actuator comprises a field member carried within the housing and having opposing first and second sides and comprising at least one permanent magnet moveable through the coil. The haptic actuator comprises a respective flexure bearing mounting each of the first and second sides of the field member to be reciprocally movable within the housing responsive to the coil. The electronic device comprises a controller coupled to the wireless communications circuitry and the haptic actuator and configured to perform at least one wireless communications function and selectively operate the haptic actuator.

The coil is around a medial portion of the housing.

The top and the bottom of the exterior have a recess therein, and the coil is carried within the recess.

The at least one permanent magnet comprises a plurality of permanent magnets.

The plurality of permanent magnets are arranged in opposing polarity.

Each respective flexure bearing has a V-shape.

The coil comprises a loop-shaped coil.

A method of making a haptic actuator comprises forming a housing having a top and a bottom and positioning a coil around the top and bottom along an exterior of the housing. The method comprises positioning a field member carried within the housing and having opposing first and second sides and comprising at least one permanent magnet moveable through the coil. The method comprises positioning a respective flexure bearing mounting each of the first and second sides of the field member to be reciprocally movable within the housing responsive to the coil.

The coil is positioned around a medial portion of the housing.

Forming the housing comprises forming the housing so that the top and the bottom of the exterior have a recess therein, and wherein the coil is positioned within the recess.

The at least one permanent magnet comprises a plurality of permanent magnets.

The coil comprises a loop-shaped coil.

A haptic actuator comprises a housing having a top and a bottom, at least one of the top and the bottom having a shape defining an internal recess therein. The haptic actuator comprises at least one permanent magnet carried within the internal recess and a field member having opposing first and second sides and comprising a coil adjacent the at least one permanent magnet. The haptic actuator comprises a respective flexure bearing mounting each of the first and second sides of the field member to be reciprocally movable within the housing responsive to the coil.

The shape comprises a planar shape with a protrusion at a medial portion thereof defining the recess.

The top and the bottom each have a shape defining top and bottom internal recesses, wherein the at least one permanent magnet is carried within the top internal recess, and wherein the haptic actuator further comprises at least one further permanent magnet carried within the bottom internal recess.

The at least one permanent magnet comprises a plurality of permanent magnets.

The at least one permanent magnet comprises a Halbach array of permanent magnets.

The housing comprises ferritic material.

Each respective flexure bearing has a V-shape.

Each respective flexure bearing has a wishbone shape.

The coil comprises a loop-shaped coil.

An electronic device comprises a housing, wireless communications circuitry carried by the housing, and a haptic actuator carried by the housing. The haptic actuator comprises an actuator housing having a top and a bottom, at least one of the top and the bottom having a shape defining an internal recess therein, and at least one permanent magnet carried within the internal recess. The haptic actuator comprises a field member having opposing first and second sides and comprising a coil adjacent the at least one permanent magnet and a respective flexure bearing mounting each of the first and second sides of the field member to be reciprocally movable within the actuator housing responsive to the coil. The electronic device comprises a controller coupled to the wireless communications circuitry and the haptic actuator and configured to perform at least one wireless communications function and selectively operate the haptic actuator.

The shape comprises a planar shape with a protrusion at a medial portion thereof defining the recess.

The top and the bottom each have a shape defining top and bottom internal recesses, the at least one permanent magnet is carried within the top internal recess, and the haptic actuator further comprises at least one further permanent magnet carried within the bottom internal recess.

The at least one permanent magnet comprises a plurality of permanent magnets.

The at least one permanent magnet comprises a Halbach array of permanent magnets.

The actuator housing comprises ferritic material.

Each respective flexure bearing has a V-shape.

Each respective flexure bearing has a wishbone shape.

The coil comprises a loop-shaped coil.

A method of making a haptic actuator comprises forming a housing having a top and a bottom, the housing being formed to have at least one of the top and the bottom have a shape defining an internal recess therein. The method comprises positioning at least one permanent magnet within the internal recess and positioning a field member having opposing first and second sides and comprising a coil adjacent the at least one permanent magnet. The method comprises positioning a respective flexure bearing to mount each of the first and second sides of the field member to be reciprocally movable within the housing responsive to the coil.

The housing is formed to have a planar shape with a protrusion at a medial portion thereof defining the recess.

The housing is formed so that the top and the bottom each have a shape defining top and bottom internal recesses, the at least one permanent magnet is positioned within the top internal recess, and the method further comprises positioning at least one further permanent magnet within the bottom internal recess.

The at least one permanent magnet comprises a plurality of permanent magnets.

The at least one permanent magnet comprises a Halbach array of permanent magnets.

A haptic actuator comprises a housing having a top and a bottom, at least one coil around the top and bottom along an exterior of the housing, and a field member carried within the housing and having opposing first and second sides and comprising at least one permanent magnet moveable through the at least one coil. The field member is reciprocally movable within the housing responsive to the at least one coil. The haptic actuator comprises a first shaft slidably coupling the first end of the field member to the housing, a second shaft slidably coupling the second end of the field member to the housing, and a first biasing member between the first end of the field member and the housing. The haptic actuator comprises a second biasing member between the second end of the field member and the housing.

The at least one coil is around a medial portion of the housing.

The at least one coil comprises a plurality of coils.

The at least one permanent magnet comprises a plurality of permanent magnets.

The plurality of permanent magnets are arranged in opposing polarity.

The at least one coil comprises a loop-shaped coil.

The haptic actuator further comprises first and second mechanical bearings carried by the field member and slidably receiving the first and second shafts.

The first and second biasing members comprise first and second springs.

An electronic device comprises a housing, wireless communications circuitry carried by the housing, and a haptic actuator carried by the housing. The haptic actuator comprises an actuator housing having a top and a bottom, at least one coil around the top and bottom along an exterior of the actuator housing, a field member carried within the housing and having opposing first and second sides and comprising at least one permanent magnet moveable through the at least one coil. The field member is reciprocally movable within the actuator housing responsive to the at least one coil. The haptic actuator comprises a first shaft slidably coupling the first end of the field member to the housing, a second shaft slidably coupling the second end of the field member to the housing, a first biasing member between the first end of the field member and the housing, and a second biasing member between the second end of the field member and the housing. The electronic device comprises a controller coupled to the wireless communications circuitry and the haptic actuator and configured to perform at least one wireless communications function and selectively operate the haptic actuator.

The at least one coil is around a medial portion of the housing.

The at least one coil comprises a plurality of coils.

The at least one permanent magnet comprises a plurality of permanent magnets.

The plurality of permanent magnets are arranged in opposing polarity.

The at least one coil comprises a loop-shaped coil.

The haptic actuator further comprises first and second mechanical bearings carried by the field member and slidably receiving the first and second shafts.

The first and second biasing members comprise first and second springs.

A method of making a haptic actuator comprises forming a housing having a top and a bottom, positioning at least one coil around the top and bottom along an exterior of the housing, and positioning a field member within the housing and having opposing first and second sides and comprising at least one permanent magnet moveable through the at least one coil. The field member is reciprocally movable within the housing responsive to the at least one coil. The method comprises positioning a first shaft to slidably couple the first end of the field member to the housing, positioning a second shaft to slidably couple the second end of the field member to the housing, and positioning a first biasing member between the first end of the field member and the housing. The method comprises positioning a second biasing member between the second end of the field member and the housing.

The at least one coil is positioned around a medial portion of the housing.

The at least one coil comprises a plurality of coils.

The at least one permanent magnet comprises a plurality of permanent magnets.

The at least one coil comprises a loop-shaped coil.

The method further comprises positioning first and second mechanical bearings to be carried by the field member and slidably receive the first and second shafts.

The first and second biasing members comprise first and second springs.

That which is claimed is:

1. A haptic actuator comprising:
   a housing having a top and a bottom, at least one of the top and the bottom having a planar shape with a protrusion extending outwardly from the housing defining an internal recess therein;
   a coil carried within the internal recess;
   a field member having opposing first and second sides and comprising at least one permanent magnet adjacent the coil; and
   a respective flexure bearing mounting each of the first and second sides of the field member to be reciprocally movable within the housing responsive to the coil.

2. The haptic actuator of claim 1 wherein the protrusion is at a medial portion thereof.

3. The haptic actuator of claim 1 wherein the top and the bottom each have a planar shape with a protrusion extending outwardly from within the housing defining top and bottom internal recesses; wherein the coil is carried within the top internal recess; and further comprising a further coil carried within the bottom internal recess.

4. The haptic actuator of claim 1 wherein the at least one permanent magnet comprises a plurality of permanent magnets.

5. The haptic actuator of claim 1 wherein the at least one permanent magnet comprises a Halbach array of permanent magnets.

6. The haptic actuator of claim 1 wherein the housing comprises ferritic material.

7. The haptic actuator of claim 1 wherein each respective flexure bearing has a V-shape.

8. The haptic actuator of claim 1 wherein each respective flexure bearing has a wishbone shape.

9. The haptic actuator of claim 1 wherein the coil comprises a loop-shaped coil.

10. An electronic device comprising:
    a housing;
    wireless communications circuitry carried by the housing;
    a haptic actuator carried by the housing and comprising
    an actuator housing having a top and a bottom, at least one of the top and the bottom having a shape defining an internal recess therein,
    a coil carried within the internal recess,
    a field member having opposing first and second sides and comprising at least one permanent magnet adjacent the coil, and
    a respective flexure bearing mounting each of the first and second sides of the field member to be reciprocally movable within the actuator housing responsive to the coil; and
    a controller coupled to the wireless communications circuitry and the haptic actuator and configured to perform at least one wireless communications function and selectively operate the haptic actuator.

11. The electronic device of claim 10 wherein the shape comprises a planar shape with a protrusion at a medial portion thereof defining the recess.

12. The electronic device of claim 10 wherein the top and the bottom each have a shape defining top and bottom internal recesses; wherein the coil is carried within the top internal recess; and wherein the haptic actuator further comprises a further coil carried within the bottom internal recess.

13. The electronic device of claim 10 wherein the at least one permanent magnet comprises a plurality of permanent magnets.

14. The electronic device of claim 10 wherein the at least one permanent magnet comprises a Halbach array of permanent magnets.

15. The electronic device of claim 10 wherein the actuator housing comprises ferritic material.

16. A method of making a haptic actuator comprising:
    forming a housing having a top and a bottom, the housing being formed to have at least one of the top and the bottom have a planar shape with a protrusion extending outwardly from the housing defining an internal recess therein;
    positioning a coil within the internal recess;
    positioning a field member having opposing first and second sides and comprising at least one permanent magnet adjacent the coil; and
    positioning a respective flexure bearing to mount each of the first and second sides of the field member to be reciprocally movable within the housing responsive to the coil.

17. The method of claim 16 wherein the protrusion is at a medial portion thereof defining the recess.

18. The method of claim 16 wherein the housing is formed so that the top and the bottom each have a planar shape with a protrusion extending outwardly from within the housing defining top and bottom internal recesses; wherein the coil is positioned within the top internal recess; and further comprising positioning a further coil within the bottom internal recess.

19. The method of claim 16 wherein the at least one permanent magnet comprises a plurality of permanent magnets.

20. The method of claim 16 wherein the at least one permanent magnet comprises a Halbach array of permanent magnets.

21. A haptic actuator comprising:
    a housing having a top and a bottom, at least one of the top and the bottom having a shape defining an internal recess therein, the housing comprising ferritic material;
    a coil carried within the internal recess;
    a field member having opposing first and second sides and comprising at least one permanent magnet adjacent the coil; and
    a respective flexure bearing mounting each of the first and second sides of the field member to be reciprocally movable within the housing responsive to the coil.

22. The haptic actuator of claim 21 wherein the shape comprises a planar shape with a protrusion at a medial portion thereof defining the recess.

23. The haptic actuator of claim 21 wherein the top and the bottom each have a shape defining top and bottom internal recesses; wherein the coil is carried within the top internal recess; and further comprising a further coil carried within the bottom internal recess.

24. The haptic actuator of claim 21 wherein the at least one permanent magnet comprises a plurality of permanent magnets.

25. The haptic actuator of claim 21 wherein the at least one permanent magnet comprises a Halbach array of permanent magnets.

26. A method of making a haptic actuator comprising:
forming a housing having a top and a bottom, the housing being formed to have at least one of the top and the bottom having a shape defining an internal recess therein, the housing comprising ferritic material;
positioning a coil within the internal recess;
positioning a field member having opposing first and second sides and comprising at least one permanent magnet adjacent the coil; and
positioning a respective flexure bearing to mount each of the first and second sides of the field member to be reciprocally movable within the housing responsive to the coil.

27. The method of claim 26 wherein the housing is formed to have a planar shape with a protrusion at a medial portion thereof defining the recess.

28. The method of claim 26 wherein the housing is formed so that the top and the bottom each have a shape defining top and bottom internal recesses; wherein the coil is positioned within the top internal recess; and further comprising positioning a further coil within the bottom internal recess.

29. The method of claim 26 wherein the at least one permanent magnet comprises a plurality of permanent magnets.

30. The method of claim 26 wherein the at least one permanent magnet comprises a Halbach array of permanent magnets.

* * * * *